(12) United States Patent
Maher

(10) Patent No.: US 12,063,310 B2
(45) Date of Patent: *Aug. 13, 2024

(54) TRUST AND IDENTITY MANAGEMENT SYSTEMS AND METHODS

(71) Applicant: Intertrust Technologies Corporation, Sunnyvale, CA (US)

(72) Inventor: David Maher, Livermore, CA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 347 days.

This patent is subject to a terminal disclaimer.

(21) Appl. No.: 17/403,576

(22) Filed: Aug. 16, 2021

(65) Prior Publication Data

US 2021/0377040 A1 Dec. 2, 2021

Related U.S. Application Data

(63) Continuation of application No. 16/290,590, filed on Mar. 1, 2019, now Pat. No. 11,102,008.

(60) Provisional application No. 62/725,902, filed on Aug. 31, 2018, provisional application No. 62/676,454, filed on May 25, 2018, provisional application No. 62/638,015, filed on Mar. 2, 2018, provisional application No. 62/638,023, filed on Mar. 2, 2018.

(51) Int. Cl.
*H04L 29/06* (2006.01)
*H04L 9/08* (2006.01)
*H04L 9/32* (2006.01)
*H04L 9/00* (2022.01)

(52) U.S. Cl.
CPC .......... *H04L 9/3242* (2013.01); *H04L 9/0844* (2013.01); *H04L 9/085* (2013.01); *H04L 9/50* (2022.05)

(58) Field of Classification Search
CPC . H04L 9/0866; H04L 9/0819; H04L 63/0236; H04L 63/0245
See application file for complete search history.

(56) References Cited

U.S. PATENT DOCUMENTS 11,102,008 B2 * 8/2021 Maher ................... H04L 9/0844
2016/0021635 A1 * 1/2016 Lee ....................... H04W 12/08
455/411

(Continued)

OTHER PUBLICATIONS

Anonymous: "Replay Attack"—Wikipedia, Feb. 14, 2018, pp. 1-5.
(Continued)

*Primary Examiner* — Shin-Hon (Eric) Chen
*Assistant Examiner* — Vladimir I Gavrilenko
(74) *Attorney, Agent, or Firm* — John P. Davis; Thayne and Davis LLC

(57) ABSTRACT

The disclosure relates to, among other things, systems and methods for facilitating the secure recording and use of assertions made by entities regarding other entities. Embodiments of the disclosed systems and methods provide mechanisms to make assertions in an authentic and authoritative manner and enable discovery and reliance on those assertions using trusted distributed ledgers and/or derivatives of the same. Various embodiments may be used in connection with establishing security associations and/or secure communication channels between entities and/or the secure management of governed electronic resources.

19 Claims, 13 Drawing Sheets

(56) References Cited

U.S. PATENT DOCUMENTS

| | | | |
|---|---|---|---|
| 2016/0127128 A1* | 5/2016 | Chen | H04L 9/0897 |
| | | | 713/189 |
| 2017/0111357 A1* | 4/2017 | Unagami | H04L 9/0891 |
| 2019/0139039 A1* | 5/2019 | Chawan | G06Q 20/38215 |
| 2020/0374343 A1* | 11/2020 | Novotny | G06F 16/9024 |

OTHER PUBLICATIONS

Fromknecht, "CertCoin: A Namecoin Based Decentralized Authentication System 6.857 Class Project", May 14, 2005, pp. 1-19.

International Search Report and Written Opinion from PCT Application PCT US2019/020349, dated May 15, 2019; 18 pages.

Lauter, et al., "Security Analysis of KEAN Authenticated Key Exchange Protocol" in "Serious Games", Springer International Publishing, Jan. 1, 2006, vol. 3958, pp. 4, 7, 378-394.

McCorry, et al., "Authenticated Key Exchange over Bitcoin", *Image Analysis and Recognition*; 11th International Conference, Dec. 9, 2015, pp. 1-19.

Menezes, et al.; "Chapter 12: Key Establishment Protocols", *Handbook of Applied Cryptography*, CRC Press LLC, Oct. 16, 1996, pp. 489-541.

Menezes, et al "Chapter 13: Key Management Techniques", *Handbook of Applied Cryptography*, CRC Press LLC, Oct. 16, 1996; pp. 543-590.

\* cited by examiner

TRUST AND IDENTITY MANAGEMENT SYSTEMS AND METHODS

RELATED APPLICATIONS

This application is a continuation of U.S. patent application Ser. No. 16/290,590, filed Mar. 1, 2019, and entitled "TRUST AND IDENTITY MANAGEMENT SYSTEMS AND METHODS," which claims the benefit of priority under 35 U.S.C. § 119(e) to U.S. Provisional Patent Application No. 62/638,015, filed Mar. 2, 2018, and entitled "SYSTEMS AND METHODS FOR SECURE COMMUNICATION USING DISTRIBUTED LEDGERS," to U.S. Provisional Patent Application No. 62/638,023, filed Mar. 2, 2018, and entitled "SECURE COMMUNICATION SYSTEMS AND METHODS," to U.S. Provisional Patent Application No. 62/676,454, filed May 25, 2018, and entitled "IDENTITY MANAGEMENT SYSTEMS AND METHODS USING DISTRIBUTED LEDGERS," and to U.S. Provisional Patent Application No. 62/725,902, filed Aug. 31, 2018, and entitled "TRUST AND IDENTITY MANAGEMENT SYSTEMS AND METHODS," the contents of all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for trust and identity management. More specifically, but not exclusively, the present disclosure relates to systems and methods that use distributed ledgers in connection managing identity and trust between systems and devices.

Systems and associated entities are becoming progressively hyper-connected. Cybersecurity initially depended in part on limiting access to individual computers. As systems became progressively interconnected and/or networked, security depended on determining what devices were part of a physical network. As physical network connections became more complex and ubiquitous, virtual secure networks were used to help establish a protective structure for network nodes. In today's hyper-connected world, however, entities may interact by introducing malicious agents inside of what are believed to be protective structures. Thus, different strategies may be employed to ensure trust and security between various connected systems and/or devices including, for example, systems and/or devices included in the Internet of things ("IoT") and/or the Internet of everything ("IoE").

The interconnection of devices and associated entities has facilitated useful ways of using these connections, allowing, for example, for the flow of sensor and/or event data associated with devices and large-scale automation. Individual connected entities may be imbued with decision networks that accept data and events as inputs, and may make decisions that themselves are events that become inputs to other decision networks that are parts of other entities. The overall functionality of such as system, however, may depend on the fluidity of these connections. Accordingly, security strategies that once depended on the ability to isolate devices may be counterproductive.

Embodiments of the disclosed systems and methods allow for connected entities to interact and provide for ways of securely identifying entities and/or securely binding and/or associating attributes with entities. Based on this information, an understanding of how entities can be trusted may be constructed. Entities may apply policies regarding how specific indications and/or interactions from other entities will affect that given entity's decisions and/or actions. In certain embodiments, identity and/or attribute management may be implemented in a secure way, allowing for policies to be realized in a scalable and flexible fashion. Embodiments of the disclosed systems and methods provide various ways of securely identifying and classifying a variety of entities in a variety of contexts, and may establish ways of trusting parties that provide those identities and/or attributes.

In various embodiments, a framework is disclosed where entities with reliable knowledge about the identity and/or attributes associated with various connected entities may record this information in a way that allows it to be discovered and/or efficiently used by other entities in a variety of applications and/or contexts. In some embodiments, the disclosed framework may support a market-based system for information about rich identity and trustworthiness. Further embodiments allow for applications to subscribe to services that specialize in providing security and/or trust management support for distributed applications by securely selecting and pre-processing the relevant attributes for an application to properly apply policy. Embodiments of the disclosed systems and methods may be used in connection with, for example, establishing ipv6-scale secure Domain Name System ("DNS") services, establishing a Public Key Infrastructure ("PKI"), managing the provenance of forensic sensor data, authenticating training data for artificial intelligence ("AI")-driven distributed processes, secure identification and collation of multimedia reports from trusted news sources, policy enforcement for secure Internet connected industrial control systems, and/or many other suitable applications.

Embodiments of the disclosed systems and methods provide, among other things, one or more of:

Robust and efficient ways of identifying entities that interact in a connected ecosystem at a relatively detailed scale that involves a variety of interaction models.

Ways of allowing an entity, when interacting with other entities, to reliably discover the relevant, authoritative attributes of those other entities and/or to apply policies and/or rules regarding how to treat requests, indications, and/or data received from those entities.

Ways of authenticating the provenance and/or integrity of data that is passed between entities and/or which may be used to influence decisions, cause actions, and/or train systems that do so.

Mechanisms for well-identified identities to interact securely without malicious interference from other entities.

In certain embodiments, information relating to identities and/or attributes regarding the capabilities and/or the trustworthiness of entities in certain contexts may be provided by trusted authorities. In some embodiments, authorities may be provided with tools to allow information relating to identities and/or attributes of other entities to be securely communicated to entities that may be interested in relying on such information. In certain embodiments, trusted authorities may provide effective information assurance services.

In the IoE, various connected entities may be the source and/or destination of communication messages, information streams, signals, and/or other types of communication. When messages from an entity are a command to a second entity (e.g., a request and/or a command for an action), proper authenticity and/or authority of the messages may be considered. Various aspects of the disclosed embodiments may enable for the determination of the authenticity and/or authority of a source of information and/or the identity and/or permissions of a destination of information.

Various disclosed systems and methods may facilitate secure recording of assertions made by entities regarding other entities that may be used in verification and/or assurance processes in a highly-scalable fashion. Certain embodiments provide for ways in which any entity can securely and authoritatively make assertions about specific subject entities in an associated domain of authority and in such a way that other entities can discover those assertions and use them to satisfy policies regarding the acceptability and/or trustworthiness of such information that may be sourced from those subject entities. Likewise, in some embodiments, an entity may make assertions about subject entities in their domain of authority so that any other entity can use those assertions in order to determine whether the subject entity has permissions to acquire and/or use information that it may prospectively send that subject entity.

Embodiments of the disclosed systems and methods provide mechanisms to make assertions in an authentic and authoritative manner and enable discovery and reliance on those assertions. Various aspects of the disclosed embodiments may be used in connection with, for example and without limitation:

Browsing, discovering, and/or identifying IoT devices.
Determining device and/or entity attributes including, for example, assertions about attributes relating to entities that may be third-party entities.
Verifying permissions when an entity requests an action from another entity.
Determining the provenance and/or authenticity of a piece of information that is used to make a decision, including, for example, decisions made by entities as part of automated processes.
Accepting and/or validating entries into shared assertion databases including distributed ledgers, as detailed below.
Accessing information from shared assertion databases where different rules and/or policies may be enforced in connection with different entities seeking the information.

Consistent with various embodiments disclosed herein, trusted databases, ledgers, and/or the like may be used to record and/or otherwise manage various assertions, bindings, attributes, identities, and/or the like associated with various entities. In some embodiments, such databases and/or ledgers may be distributed and may be referred to herein as trusted immutable distributed assertion ledgers ("TIDALs") and/or variations of the same. TIDALs consistent with various aspects of the disclosed embodiments may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

Embodiments of the disclosed systems and methods may enable a system of TIDALs that may refer to one another through the use of intrinsic policies and may be designed to promote specialization and coordination with the real authorities governing various forms of information. In certain instances, producers of trusted information may not necessarily have close relationships and/or detailed understanding of the consumers of trusted information.

Certain embodiments disclosed herein may provide for TIDAL derivatives that may be designed to efficiently serve such consumers of information including, for example, applications that are configured to check application-intrinsic policy before taking an action. Applications may need to check various types of assertions before granting a user of the application access to a resource, which could include a number of different considerations that are germane to the application, including the freshness of the assertion (e.g., the time it was most recently renewed or checked for revocation).

Various embodiments may further use an efficient mechanism for establishing a security association between at least two entities. In certain embodiments, a shared cryptographic key may be used by two or more entities to encrypt information and/or to authenticate commands with one another. Such techniques may be useful in connection with establishing security associations in the context of the IoT. Certain embodiments disclosed herein may extend such techniques in connection with the establishment of secure web sessions and/or the secure provisioning of governed information assets.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
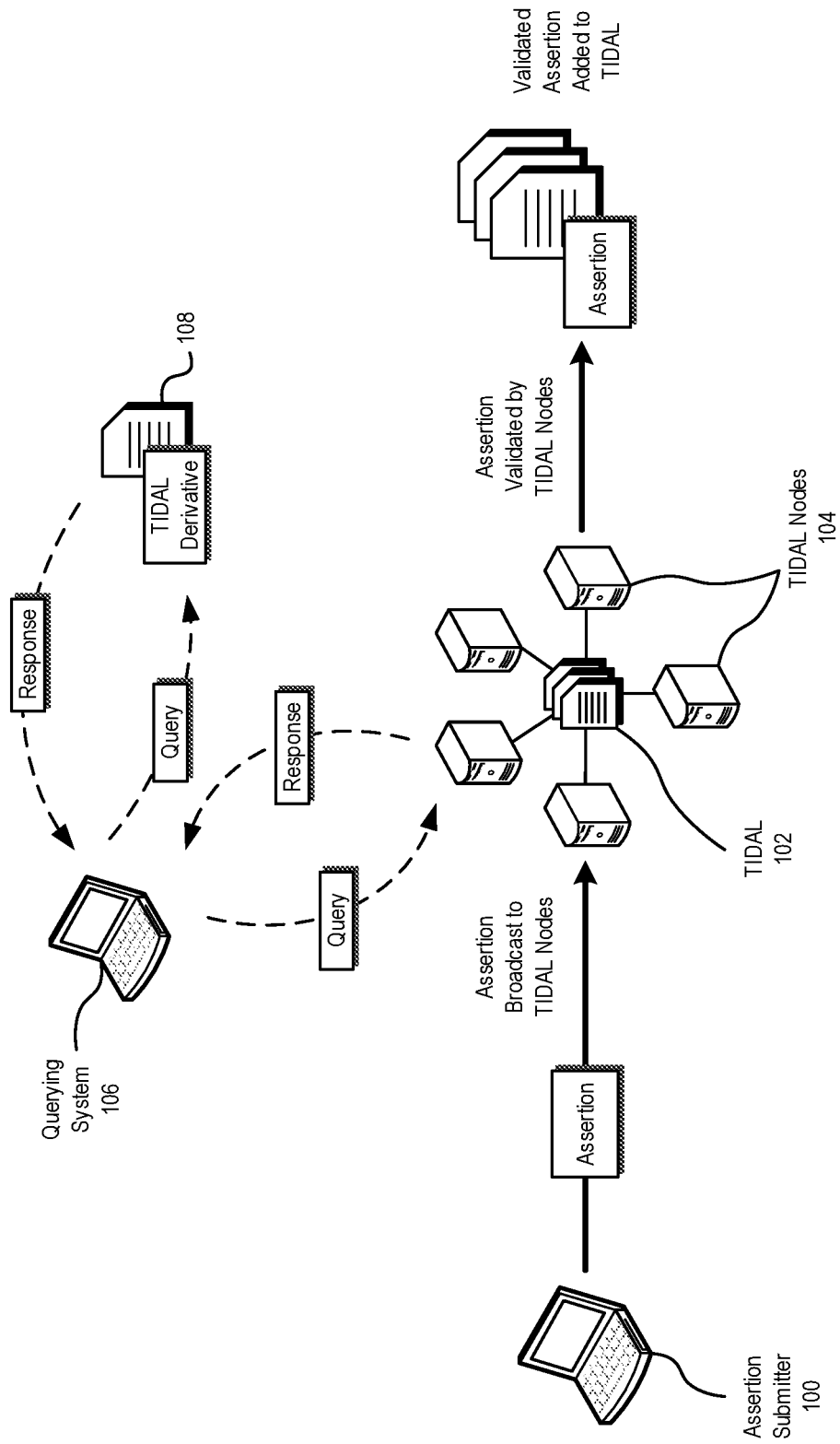
FIG. 1 illustrates an example of the management of a distributed ledger consistent with certain embodiments disclosed herein.

A description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Secure identification and/or classification in connection with policy management and/or enforcement actions may involve authentication processes. Information and/or entities may be authenticated for a variety of reasons. For example, it may be desirable to authenticate the identity and/or the authority of an entity that may wish to be granted access to a managed resource. As used herein, an entity may comprise, for example, any device, system, node, application, software container, individual, and/or organization, although other types of entities are also contemplated for use in connection with various aspects of the disclosed embodiments. A resource may comprise, for example, a database, electronic information, electronic content, a secure communications channel, a network, and application, and/or any other type of resource.

The provenance of information (which may be expressed as attributes of origination) and/or the integrity of information (such as, for example, sensor information) may also be authenticated for assurance purposes. In yet further examples, attributes associated with an entity—including certifications, licenses, rights, obligations, memberships, and/or any other statement and/or piece of information that other entities may need to rely on—may need to be authenticated in connection with various activities involving secure communications and/or trust.

In general terms, authentication consistent with aspects of the disclosed embodiments may involve producing and/or recording evidence that can be used to authenticate information and, subsequently, verifying such evidence in connection with authentication processes when an entity wants to use the information. Various embodiments of the disclosed systems and methods may provide effective ways to both produce and/or record authentication evidence and to verify such evidence during information authentication processes.

Certain embodiments disclosed herein may provide mechanisms where entities that are known to have authority over, and/or are otherwise trusted with respect to, the authenticity of certain information can easily and/or securely affirm the authenticity of information including, for example and without limitation, identity relationships, provenance of information, and/or information integrity. Further mechanisms allow for witnesses to attest that assertions from such trusted authorities were made and/or that the trusted authorities had authority regarding the asserted information at the time the assertion was made. In addition, embodiments may allow for the immutable recordation of assertions in a database and/or ledger such as, for example, a TIDAL, that may be accessible by other entities who may later rely on that information, as well as for the revocation and/or updating of affirmations by the trusted authorities (e.g., adding to the immutable recordation of assertions). Various embodiments may provide for mechanisms where entities may discover relevant recorded trusted assertions regarding the authentication of certain information at the moment the entities need to rely on such assertions.

In various embodiments, policies may be used in connection with governing the requisite evidence to allow information to be immutably recorded to a database and/or ledger. In further embodiments, policies may be used to specify how information recorded in a database and/or ledger should be used in connection with decisions in various applications and/or contexts.

Various embodiments of the disclosed systems and methods may be based on the notion of authority over information where assertions may be made regarding the authority of some entity that makes an assertion regarding a specific topic in an information domain. In various embodiments, domains may be relatively closely bound to an area of authority over information. For example, a domain may comprise a person, an origination, a corporation, a governmental entity, and/or the like. In some embodiments, domains may include and/or otherwise be related to Internet domains. Topics may be relatively closely bound to a type of information such as, for example, a type of attribute, agreement, and/or license. In certain embodiments, domains may be globally unique and/or their names may be registered. Topics may be unique within a domain and/or established by authorities named in a domain.

Policies may enable aspects of the disclosed embodiments to determine what evidence should be required to allow recording of an assertion into a publicly accessible database and/or ledger. In various embodiments, policies may be sensitive to the contextual notion of authority regarding an associated domain and/or a topic of an assertion. In certain instances, policies governing the recording of assertions—which in certain instances may be referred to as policies intrinsic to the database—may differ from policies regarding how different entities will rely on those assertions for varying purposes—which may be referred to in certain instances as policies extrinsic to the database. In certain global authentication frameworks consistent with various embodiments, the intrinsic policy of a given publicly accessible database and/or ledger of assertions about information will itself be publicly accessible, but the policy individual entities use when they want to rely on that information may remain proprietary to that entity.

Trusted Immutable Distributed Assertion Ledgers

Trusted databases and/or ledgers consistent with various aspects of the disclosed embodiments may be referred to herein as TIDALs and derivatives of the same. Consistent with the disclosed embodiments, TIDALs may be associated with a variety of properties that may include one or more of:

Ledger processes that may be resistant to byzantine failures.

Entries that may be immutable.

Entries that may be time synched (at least in part). Distinguished sets of new entries (e.g., such as blocks in a blockchain) may have an immutable ordering whereby newer (e.g., newer in actual time) entries may be relatively higher in order than earlier entries. Entries may be timestamped to identify a specific time of entry. Entries, however, may or may not occur at regular intervals.

Ledgers may be scalable in number of entries.

Entries in a ledger may be available for relatively fast lookup and/or search.

In certain embodiments, scalability and fast lookup and/or search may be achieved and/or otherwise improved by using derivatives of a TIDAL, if not by the ledger itself.

Consistent with various disclosed embodiments, TIDAL paradigms may comprise permissioned blockchains that use efficient byzantine agreement protocols. In some embodiments, ledger entries may comprise assertions, made by a class of qualified submitters, that each binds a key (and/or a hash or other derivative of a key) with other attributes that are associated with that key, such as the identity of the owner (e.g., as in the Freshkey protocol in more detail below), the scope of authority of the owner, information rights management permissions, and/or the like.

A TIDAL may be distributed among a plurality of nodes. A full node may have a full copy of the ledger. In certain embodiments, TIDAL actors, nodes, and/or entities may include assertion submitters, witnesses and/or verifiers, and/or distributed ledger node operators.

In certain implementations, a number of TIDALs may be employed, each of which may specialize in the recording of various types of assertions with appropriate policies for the associated assertion types. In some embodiments, a given application may rely on the authenticity of multiple assertions will either directly and/or indirectly query multiple TIDALs. For example, a TIDAL may be indirectly queried when a TIDAL derivative is queried. In some embodiments, a TIDAL derivative may comprise one or more databases and/or ledgers derived from information recorded in one or more other TIDALs. In certain embodiments, a TIDAL derivative may be focused on a class of applications that have specified requirements for efficiently authenticating specific assertions.

In some embodiments, TIDALs may be used to collect assertions and/or evidence of authority for a node that affirms such information, allowing multiple parties to cross check for compliance with policy. TIDALs may record the authentication information (e.g., a hash of the assertion) in public parts of the database and/or ledger. In certain instances, some applications may record the hash of encrypted information. Other applications, however, may record the hash of the information plaintext in a way such that access to the authentication information is governed and/or may be modified (e.g., nullified). Access to unhashed plaintext information may be governed by different applicable policies.

In certain embodiments, a TIDAL may comprise a blockchain, although other database and/or ledger structures may be used. For example, hashgraphs, tangles or directed, acyclic graphs, and/or the like may also be used in connection with various aspects of the disclosed embodiments. In some embodiments, TIDALs may be publicly readable, but in other embodiments they may not necessarily be publicly readable. For example, in connection with various aspects of the disclosed embodiments, TIDALs may not necessarily be publicly accessible in every application, with some applications using multiple TIDALs, some of which may be public and some private. Furthermore, in some embodiments, a TIDAL may be replaced and/or used in conjunction with a database that lacks some of the properties of a TIDAL, as may be the case for parts of a protocol where distributed trust is not necessarily required.

In various embodiments, TIDALs may be permissioned. In certain embodiments, TIDAL permissions may be based, at least in part, on topics and/or domains associated with assertions to be recorded in a TIDAL.

FIG. 1 illustrates an example of the management of a distributed ledger 102 consistent with certain embodiments disclosed herein. In certain embodiments, the distributed ledger 102 may comprise a TIDAL and/or any other suitable type of distributed database and/or ledger in any suitable form.

As illustrated, an assertion submitter 100 may submit an assertion for recordation in the ledger 102. In some embodiments, the assertion submitter 100 may comprise an entity and/or system that possesses credentials indicating authority to submit assertions for consideration to be recorded in the ledger 102. In some embodiments, a submitted assertion may comprise an identifier associated with the assertion submitter 100 that may be used by various ledger nodes 104 in connection with a verification and/or witnessing process to determine whether the assertion submitter 100 has the requisite authority to make a submission of the specific type and/or with the scope reflected in the submitted assertion for inclusion in the ledger 102.

The submitted assertion may be broadcast to various ledger nodes 104 that may, among other things, maintain and/or otherwise manage the ledger 102. In certain embodiments, at least a portion of ledger nodes 104 may be configured to verify submitted assertions prior to recordation of the assertions in the ledger 102. Consistent with various disclosed embodiments, assertions may be entered into the ledger 102 upon the agreement of multiple ledger nodes 104 operating as witnesses and/or verifiers. The ledger nodes 104 operating as witnesses and/or verifiers may verify the authenticity of the authority of the assertion submitter 100 to verify that the putative authority is in fact authorized to make the assertion in accordance with one or more applicable policies. In some embodiments, to verify the authenticity of the authority of the assertion submitter 100 to make the submitted assertion, the ledger nodes 104 may check previous entries in the ledger 102 and/or entries in other ledgers and/or associated ledger derivatives to verify that the assertion submitter 100 is authorized to make the submission to the ledger in accordance with applicable policy.

The ledger nodes 104, operating as witnesses, may verify a variety of information prior to recording a submitted assertion in the ledger 102. For example, the ledger nodes 104 may verify that an identifier submitted with the assertion (e.g., an ID of the assertion submitter 100, a public key, and/or the like) is valid and/or has not been revoked. The ledger nodes 104 may further verify that the submitter's scope of authority includes authority over the subject of the assertion. In certain embodiments, this may involve verifying prior submissions regarding the assertion submitter 100 included in the ledger 102.

In various embodiments, verified assertions may be placed into a pool to be entered into the ledger 102, and when a threshold number of ledger nodes 104 operating as witness agree regarding the authenticity and/or the actual authority of the assertion submitter 100 to make the assertion, the assertion may be recorded in the ledger 102. In certain embodiments, this agreement may be reached in accordance with an applicable agreement policy using, for example and without limitation, a byzantine agreement protocol and/or another suitable protocol. Once agreement has been reached, the assertion may be considered validated by the ledger nodes 104 and the submission may be recorded and/or otherwise entered into the ledger 102.

A querying system 106 interested in determining whether an assertion and/or a certain type of assertion (e.g., an assertion relating to a particular device and/or the like) has been recorded in the ledger 102 may be configured to query one or more of the ledger nodes 104 and/or other associated systems and receive associated responses. As discussed in more detail below, in various embodiments, the querying system 106 may query a system maintaining a ledger derivative 108, which may comprise one of the ledger nodes 104 and/or another system, and may receive associated responses indicative of assertions recorded in the ledger 102.

TIDALs and Policy Enforcement

In various embodiments, one or more policies may be applied and/or otherwise enforced in connection with the management and/or use of a TIDAL including in the recording of assertions. For example, as described above, policies may determine what entities may record assertions about a given topic and/or domain and/or specifics relating to the agreement necessary among different ledger node operators for a new entry to be included in a ledger. In certain embodiments, applicable policy may be enforced when a request for an assertion entry into a ledger is made by authenticating a request and ensuring that the requester has the authority to make the subject assertion. In further embodiments, applicable policy may be enforced to assure that ledger entries are immutable and/or relatively immutable and/or the recording process is trustworthy and/or resistant to byzantine failures from benign and/or malicious causes.

Policies used in connection with various aspects of the disclosed embodiments may be dynamic and/or variable based on the type of information to be recorded into a ledger. In certain embodiments, TIDALs and/or associated node operators may reference other TIDALs to verify evidence that there is compliance with applicable policy. Various embodiments disclosed herein allows for numerous TIDALs that may have different policies for ingestion and/or recording of associated assertions. This may allow for a specific TIDAL to include specialized information and/or specific types of assertions about specific classes of entities.

For example, a TIDAL can specialize in recording assertions about devices made by network device manufacturers. Another TIDAL can specialize in certifying compliance with safety and conducted and radiated emissions standards for communications equipment. Yet another TIDAL can specialize in certifying the credentials of entities associated with service providers who use and provision communication equipment. Such specialization can allow each TIDAL to maintain relationships with representatives of different parts of the communications industry to ensure that the appropriate policies for accepting and recording assertions are met.

By maintaining close relationships, TIDAL operators can appropriately adjust policies to balance different risks and to favor protocols for recording assertions that can meet performance requirements (e.g., in such things as assertion transaction rates) that may be associated with industry applications requirements. Enforced policies can affect the trustworthiness and/or authority of assertions for accepting the submission of an assertion from an entity and/or for officially recording the assertion in the ledger. For example, a policy can require that a submission originate from an entity that can prove (e.g., prove using cryptographic means) its identity and/or authority to make an assertion about a device that has a given set of characteristics and which belongs to a certain registered domain. A second policy used to govern recording assertions in a ledger can require that a minimum number of stakeholders from each of several classes of stakeholders (e.g, such as manufacturers, testing organizations, and communications service providers) verify compliance with the first policy.

Policies implemented in connection with various disclosed embodiments may differ from industry to industry (e.g, communications, media, banking, etc.) both vertically and horizontally. Embodiments of the disclosed systems and methods may, in some instances, allow groups of stakeholders to use a TIDAL implementation that most effectively meets associated trust and/or performance requirements to participate in a global network of TIDALs that may each refer to one another for confirmation of assertions useful to non-TIDAL applications but also useful for the actions performed by TIDAL node operators themselves. In certain embodiments, specialization of TIDALs can allow smaller groups of interdependent stakeholders to adjust policies in an orchestrated way, and to efficiently monitor the effects of changes of such policies. A given TIDAL may use a recording agreement policy that specifies an agreement protocol (e.g., a byzantine agreement protocol) as well as threshold parameters (e.g., such as the number of verifiers from different stakeholder classes) that may be used in connection with the agreement protocol. In various embodiments, these parameters may be adjusted and/or otherwise varied based on type of assertion being recorded.

Various TIDALs consistent with aspects of the disclosed embodiments may be used to record assertions that can be checked for authority and/or authenticity from many different specialists. In certain embodiments, integrating dynamic policies in connection with TIDAL management actions may allow for efficient controls to be introduced for different types of actions as different risks are identified and as new TIDALs introduce assertions that can be checked for different kinds of controls. This may include, for example, TIDALs that are used to check policies for operation of cyber-physical resources (e.g, such as online controls for operating electrical microgrid substations and/or irrigation dam floodgates), but also for changes in intrinsic policies in TIDALs. Over time TIDALs can be added and adjusted by operators to improve the efficiency and/or trustworthiness of operations.

DNS Server Implementation Using TIDALs

Figure 2:
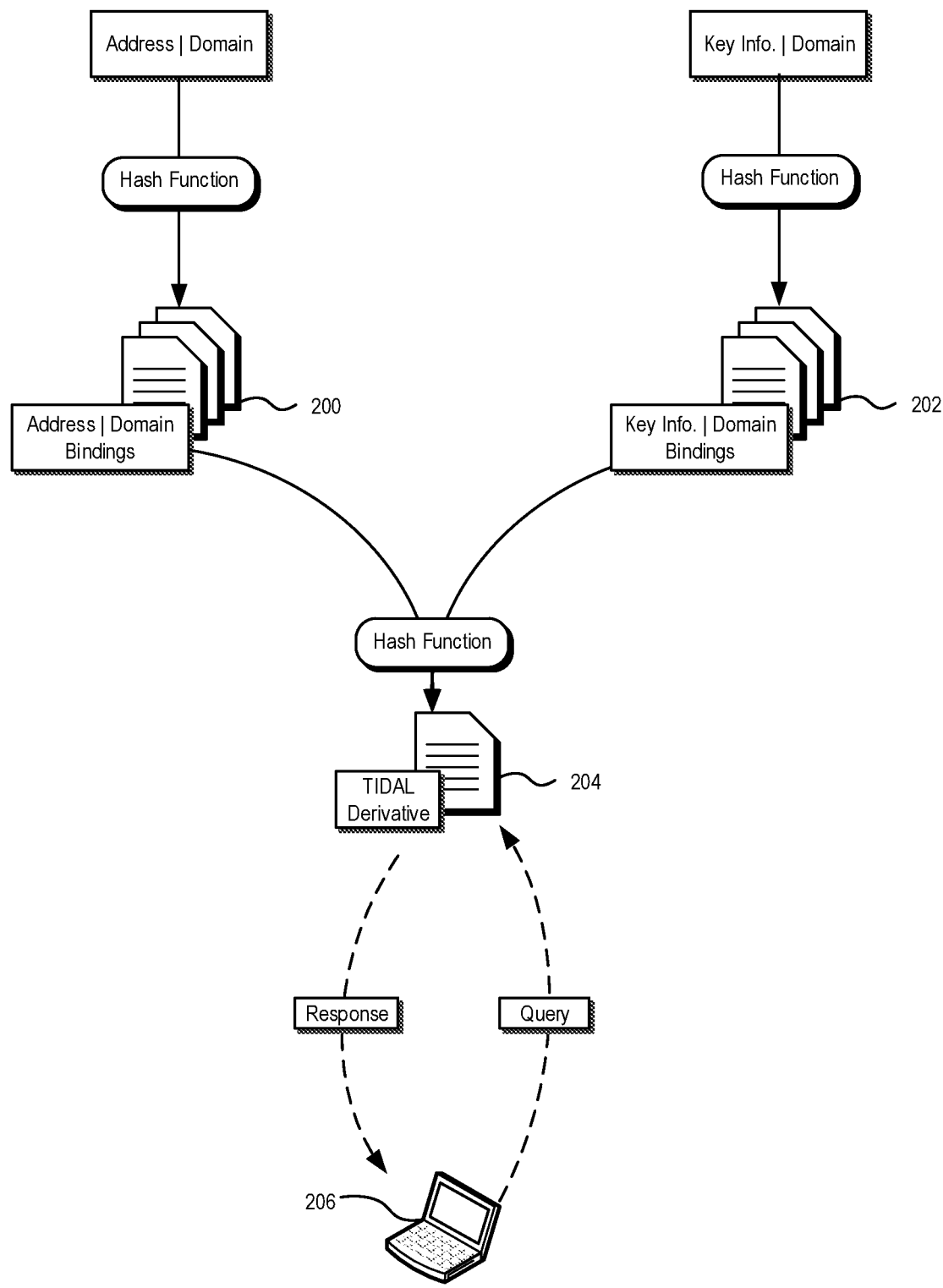
FIG. 2 illustrates an example of using distributed ledgers and associated ledger derivatives in connection with a domain name service consistent with certain embodiments disclosed herein.

In various embodiments, a TIDAL may be used in connection with implementing a DNS server. FIG. 2 illustrates an example of using distributed ledgers and associated ledger derivatives in connection with a DNS service consistent with certain embodiments disclosed herein. In some embodiments, a TIDAL 200 may record assertions linking device addresses (e.g, IPv6 addresses) and domains. In such an example, a TIDAL entry may include a hash H1 computed as follows:

$$H1=h(\text{IPv6\_address}|\text{domain\_name})$$

where h is a hash function such as SHA-512.

A TIDAL 202 designed to record assertions linking domain names and thumbprints (e.g., hashes) of public cryptographic keys for devices using those domain names may also be established. An entry in this TIDAL may include a hash H2 computed as follows:

$$H2=h(h(\text{public key})|\text{domain\_name})$$

where h is a hash function such as SHA-512.

A TIDAL derivative 204, which may itself be a TIDAL and/or a different derived database, table, and/or ledger, may further be established designed to help applications, devices, and/or other entities that depend on knowledge of the proper device address (e.g., IPv6 address) and the public key of a device. Such a TIDAL derivative 204 may be associated with a TIDAL derivative operator that includes a component that uses agents to monitor copies of each of the two aforementioned TIDALs 200, 202. This TIDAL derivative 204 may maintain a table of hashes of the form:

$$H3=h(H1|H2)$$

where h is a hash function such as SHA-512. In certain embodiments, even using relatively large (e.g, 512 bit) hashes, such a hash table for a larger number of domains may remain relatively small in size.

When an entity 206 (e.g, a system, device, application, and/or the like) wants to send a secure message to a device within a given domain, it may compute H3 locally, and query and/or otherwise look up the computed hash in the hash table of the TIDAL derivative 204. If it is not found, then the information may be deemed invalid based on applicable policy. This may be a relatively rare occurrence and, accordingly, a secondary search may be performed in some implementations. For example, the original TIDALs 200, 202 used to derive the hash table may be searched to reveal the reason for the error (e.g., such as a revocation and/or the like).

In many cases, the hash may be found relatively quickly within the hash table of the TIDAL derivative 204. In some circumstances, this may be faster than locating and verifying certificate chains of corresponding Domain Name System Security Extension ("DNSSEC") and/or transport layer security ("TLS") certificate entries. As the hash table may be relatively small, many copies may be maintained, and agents may cross check multiple hash tables. In further embodiments, different policies for different applications may determine whether to perform redundant hash table lookups, cache results of lookups, and/or the like.

TIDAL Derivatives and/or Indexes

In some embodiments, a TIDAL derivative may comprise one or more databases, tables, and/or ledgers derived from information included one or more TIDALs. TIDAL derivatives may be focused on a class of applications that have specified requirements for efficiently authenticating specific assertions. In certain applications, scalability and fast lookup and/or search may be achieved and/or otherwise improved by using TIDAL derivatives.

Information included in a TIDAL may change and assertions recorded in ledgers may over time be revoked and/or otherwise modified. When an assertion in a TIDAL is revoked, the revocation assertion may be included in the same TIDAL as the original assertion. In various embodiments, a TIDAL derivative may be associated with components that monitor TIDALs for revocations and/or updates. Systems, entities, and/or nodes maintaining these TIDAL derivatives may then remove the corresponding hashes from hash tables they maintain and/or provide secondary lists that are searched when such errors occur in the main hash table as a result of a revocation.

Consistent with various disclosed embodiments, TIDAL derivatives may function in a different computational context than associated publicly-accessible TIDALs and/or may be secured appropriately for a given application and/or entities that they support. TIDAL derivatives may further be redundant. For example, multiple, independently-maintained cross checking TIDAL derivatives may exist for a given application and/or sets of entities.

In various embodiments, TIDAL derivatives may organize authentication information, cross check it with multiple copies of each TIDAL they monitor and/or other TIDALs that include the same authentication information, and/or may maintain special hash tables for common authentication queries making verification of authentication information relatively efficient even for databases with a significant number of assertion entries.

When compared to authentication methods that rely on digital certificates, certain embodiments disclosed herein may allow for improved forward security. For example, once a digital certificate signing key is compromised, certificates signed with that key, including those signed before the compromise, may be deemed invalid. In connection with the disclosed embodiments, however, if an assertion is submitted to a TIDAL, even if the assertion was presented by an authority using a digital certificate whose signing key is subsequently compromised, the immutability of the TIDAL may be maintained. TIDALs may accept multiple forms of evidence when an assertion is submitted including, for example, multiple certificates and/or other kinds of evidence such as proofs of location, coercion-evading protocols, and/or the like.

Figure 3:
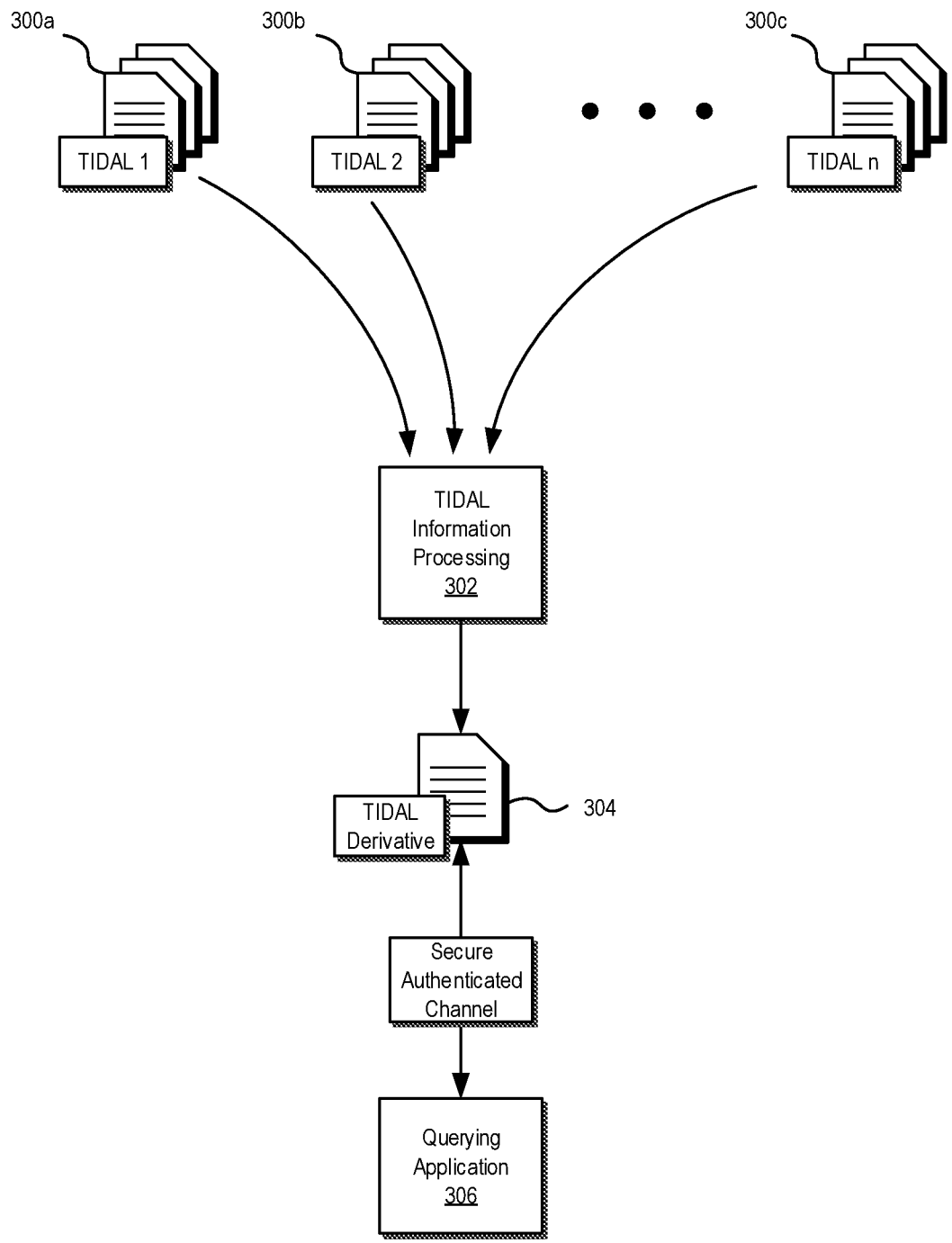
FIG. 3 illustrates an example of the generation of a ledger derivative consistent with certain embodiments disclosed herein.

FIG. 3 illustrates an example of the generation of a ledger derivative 304 consistent with certain embodiments disclosed herein. In certain embodiments, information included in one or more TIDALs 300*a*-300*c* may be examined and/or processed by TIDAL information processing methods 302 of an associated system to produce an associated TIDAL derivative 304. As illustrated, in some embodiments, a TIDAL derivative 304 may include information generated from assertions recorded in a single TIDAL and/or multiple TIDALs 300*a*-300*c*. In further embodiments, a TIDAL derivative 304 may comprise information generated from assertions recorded in one or more TIDALs 300*a*-300*c* in conjunction with other information (e.g., other TIDAL derivatives and/or the like).

A variety of suitable operations may be performed on TIDAL information by TIDAL information processing 302 to generate a TIDAL derivative 304. In certain embodiments, information included in one or more TIDALs 300*a*-300*c* may be processed and optionally combined with other information to produce information regarding assertions included in the TIDALs 300*a*-300*c*. In some embodiments, TIDAL information processing 302 may be configured to produce hashes of multiple assertions from multiple TIDALs 300*a*-300*c*. In this manner, the TIDAL derivative 304 may reference assertions from multiple TIDALs 300*a*-300*c* in the form of hashes of compound assertions. For example, a TIDAL assertion binding a domain and/or URL with an IP address and a TIDAL assertion binding a domain and/or URL to a public key, which may be included in separate TIDALs, may be hashed to produce an indication of a compound assertion.

In various embodiments, the TIDALs 300a-300c and/or TIDAL derivative 304 may be queried by an application 306 via a secure authenticated channel in connection with various decisions relating to TIDAL assertion information. In certain embodiments, the system maintaining TIDAL derivative 304 may update and/or otherwise maintain the information included in the TIDAL derivative 304 as information included in the one or more TIDALS 300a-300c is updated and/or otherwise changed. For example, the system maintaining the TIDAL derivative 304 may maintain included hash tables by adding more entries from the TIDALs 300a-300c associated with the TIDAL derivative 304 and/or by removing and/or replacing entries representing assertion revocations and/or updates in the TIDALs 300a-300c, thereby allowing the querying application 306 relying on the TIDAL derivative 304 to have the freshest information.

TIDAL derivatives may be designed to cater to specific classes of applications and may gather the proof of authenticity of assertions from one or more TIDALs and/or refresh those associations in a timely way. In this manner, in some embodiments, TIDALs may specialize to provide efficient interfaces for producers of trusted information, and TIDAL operators may be configured to enforce policies that ensure the authority and/or authenticity of assertions they record, whereas TIDAL derivatives may be designed to specialize in the needs of consumers of trusted information. This may, among other things, allow for TIDAL derivatives to be effective in revocation and/or renewal check operations.

As discussed above, TIDALs may immutably and/or relatively immutably record assertions. In some instances, however, assertions may be found to be faulty and/or based on submissions that were authenticated and/or otherwise authorized using cryptographic secrets that were compromised. In various embodiments, TIDAL derivatives may monitor specific TIDALs that are of interest to a specific application and/or a specific set of applications, and may discern that new assertions effectively nullify and/or update prior assertions. While an application can reference TIDALs directly in connection with various policy-managed actions, they may instead and/or additionally reference one or more TIDAL derivatives that may, in effect, preprocess some of the checking and/or verification operations, and/or filter out and/or otherwise flag nullified, expired, and/or old assertions that have been updated. In some embodiment, a TIDAL derivative may, for example, use hashing techniques that may allow multiple assertion checks to be combined in a hash table, thereby increasing the efficiency of certain verification operations.

In at least one example, an Internet browser (e.g., an automated IoT discovery browser) may need to reference a correct IP address associated with a URL and/or to authenticate the binding of a TLS key with the URL. The Internet browser may also need to ensure the relied upon information is up to date and unrevoked. Consistent with various aspects of the disclosed embodiments, a TIDAL derivative specializing in monitoring TIDALs that record these bindings, and revoking and updating them as appropriate, may include a hash value that may be referenced by the Internet browser to verify a binding. The browser application may compute the hash value it expects to be located in the TIDAL derivative, and may query the TIDAL derivative operator to verify the computed value is included within the TIDAL derivative. This hash check may be relatively fast and may return either an indication that the value was found and/or a negative result that, in some instances, may include a reference to a resource where the negative result can be investigated.

TIDALs and Privacy Considerations

TIDALs consistent with aspects of the disclosed embodiments may be sensitive to certain privacy concerns including, for example, a right of an entity's prior associations to be forgotten and/or otherwise removed. In certain embodiments, a TIDAL and/or another immutable database and/or ledger consistent with aspects of the disclosed embodiments may record assertions linking an attribute to an ID and be used in connection with applicable authentication processes. For example, three strings of information may be used to establish such a link: an ID, a group membership associated with the ID, and a hash value—h(ID|Group_membership).

The hash may be stored in a TIDAL, and the other two strings—the ID and the group membership—may be stored in a database that allows deletions and/or encryption with key deletion. In such an implementation, however, after deleting the information from the database that allows deletions and/or changes, the hash may remain in the immutable TIDAL and an entity may compute the hash and discover it in the TIDAL to determine that the ID was a member of the particular group at one time.

To mitigate this, a privatizing token T may be used when recording the hash in the database. For example, a hash may be computed as h (T|ID|Group_membership) and be recorded in the database. The privatizing token T may comprise a random number of sufficient size to mitigate a brute-force attack and/or may be unique to the record. If the TIDAL is searched, the hash computed using the privatizing token may only appear as a random string. If an entity wished to verify membership of the ID in the group, they would thus need to have the privatizing token T. An entity associated with the ID may have control over the token, and if they wished to have their association with the group be deleted and/or otherwise removed, they may destroy the token. In further embodiments, a trusted intermediary may maintain and/or use the token, but may not reveal it to others and/or may destroy it when instructed by the entity associated with the ID.

TIDALs and Certificate Authorities

The use of TIDALs consistent with various embodiments disclosed herein may offer certain improvements over conventional identity and trust management techniques that employ certificates. For example, the use of TIDALs consistent with certain disclosed embodiments may provide a property that may be referred to as Perfect Forward Authentication ("PFA"). Submitters may use their public key to sign submissions. When their public key is compromised and either the time when it was compromised or a time when it was not compromised was known, then submissions prior to that time do not need to be revoked, as the immutable time stamp in the TIDAL can be checked.

In comparison, when a certificate signing key is compromised, certificates signed by the key in the past may lose their authenticity, since certificates do not by themselves have an extrinsic timestamp (e.g., timestamps are typically part of the information that is signed). Certificates signed by the compromised key may not be trusted unless some other mechanism (e.g., such as a TIDAL) can be used to verify that the certificate was created before the compromise. This may impact certificate chains, where keys sign certificates for keys which then can sign certificates for lower level keys. Consistent with the disclosed embodiments, TIDALs may have similar delegation capability, and their associated PFA property may mean that when a key is compromised, only assertions in certain subtrees below that key need to be revoked, depending on when their subtree roots were signed. In contrast, when a higher-level key in a certificate chain is compromised, keys below it may be not necessarily be trusted.

In certain embodiments, a TIDAL may comprise a blockchain. In further embodiments, other database and/or ledger structures may be used. TIDALs may be immutable in a manner that is either strongly or weakly realized and may be implemented differently in varying applications. A variety of implementations of TIDALs may be used in connection with aspects of the disclosed embodiments. As noted above, TIDALs may be trusted and/or relied upon to be authoritative regarding a specific type and/or types of assertions.

A certificate authority may be associated with one or more parts: a registration authority and/or a certificate provisioning authority. The registration authority may ensure that information that is subsequently certified is correct and originates from an authoritative source. TIDALs consistent with various disclosed embodiments may perform this function as well, and may use methods employed by certificate authorities, but may also use other methods to facilitate scaling and support more granular and/or otherwise detailed policies.

TIDALs and/or associated TIDAL derivatives may be relatively effective for identity and trust management processing within the IoE for a variety of reasons and may improve upon certain limitations of conventional certificate authorities and associated ecosystems. For example, conventional certificate authorities may be limited by one or more of the following issues:

Scale: Certificate authorities may be hierarchical rather than distributed, and the production of trusted assertions may be limited by the lesser ability of certificate authorities to efficiently organize means for trusted assertions from authorities that may need to cover a larger number of diverse topics from a larger number of authoritative sources that may interact in non-hierarchical ways.

Forward Integrity: As discussed above, certificate-based systems may rely on the security of signing keys. When a signing key is compromised, certificates signed with the key both in the future as well as the past may lose verifiable authenticity.

Revocation and Renewability: Revocation and renewability may be difficult and less amenable to scaling with conventional certificate authorities, even for homogenous applications. This may introduce challenges with identity management of entities that are associated with attributes that change with some frequency.

Improvements in Computing: Conventional certificate schemes may be vulnerable to quantum computing attacks.

The use of TIDALs and/or associated TIDAL derivatives consistent with various disclosed embodiments may ameliorate at least some of these and/or other limitations associated with conventional certificate authorities.

In various embodiments, a heterogenous system of TIDALs that may have common interfaces may provide a foundation for a universal recording mechanism for a variety of types of trusted assertions regarding rich identities for a variety of kinds of entities. In some embodiments, the system may naturally and/or securely support assertions from authorities relating to diverse attributes about diverse entities. The system may scale as more entities need to rely on one another in a hyper-connected IoE environment. Trusted TIDAL derivatives may operate to make the latest trusted assertions, including changes and/or revocations, available in a relatively efficient manner. Users of trusted information may access such information with relatively low latency and high reliability with costs scaled to a level of assurance.

In certain embodiments, relatively simple optimizable components may be designed to provide a highly reliable, adaptable, and/or scalable system that may efficiently transfer information from trusted assertion producers with recognized authority on specific topics to trusted assertion consumers that may use the information according to specific applications and/or personalized policies. Various embodiments disclosed herein may involve less overall computational resources that conventional certificate-based systems and may allow for pre-computation and/or caching strategies to be employed in a manner that addresses fewer available computing resources in certain devices and/or for low latency and/or periods of offline use.

Trust and Identity Management Architecture Entities and Components

Embodiments disclosed herein may provide for identity management systems and methods that may securely support distributed software for distributed computation models. Various embodiments may provide trust management capabilities for many types of entities including, for example, physical machines possessing computational components, software containers, software applications, individuals acting in different roles, organizations, and/or authorities that may map licenses, trusted capabilities, and/or other attributes to identities. Certain embodiments may efficiently support distributed systems as well as traditional client-server models and/or system applications such as digital rights management ("DRM") models for shared content.

In various embodiments, and in certain instances herein, identifiers, which may comprise strings uniquely associated with an identity (e.g., unique either globally or in context) may be distinguished from identity, which may comprise the union of identifiers and/or attributes associated with an entity. Thus, identifiers may be used to distinguish entities, and identity attributes may be used to determine, for example, what an identity is and/or what its characteristics and/or associated attributes are. Identifiers may be used in a variety of other functions as well. For example, a public key may function as an identifier for an entity and as an object used in a protocol as evidence of identity.

Embodiments of the disclosed trust and identity management architecture may involve a variety of entities and/or components including, for example, one or more of:

Hosts: Hosts may comprise physical devices that "host" functionality. This functionality may be hard-coded and/or updatable. Hosts may further comprise virtual machines. In some instances herein, the terms system and/or device may refer to a physical host.

Hosted Software Applications: Hosted software applications may comprise applications that are resident on a host. In some embodiments, such applications may be components within a distributed application.

Distributed Applications: Distributed applications may be distributed across a number of hosts.

Software Components: Software components may comprise portions of software applications (e.g., single hosted and/or distributed applications) that may provide some logical set of functionality. Software components may have their own application programming interfaces ("APIs").

Containers: Containers may comprise executable packages of software that may be self-contained. For example, containers may comprise code, runtime, libraries, configuration information, and/or the like. Containers may help provide for portability across many types of hosts and/or platforms.

Registries: Registries may comprise databases that list system component identifiers and/or component attributes.

TIDALs: As detailed above, TIDALs may comprise distributed databases, tables, and/or ledgers with immutable and/or relatively immutable entries that can be an authoritative source of identity information. They may list assertions relating identifiers and/or attributes such as, for example, a public key and/or an identifier string, an identifier and/or the name of an owner, and/or the like. A TIDAL may also record assertions that relate identifiers and/or attributes with data. One example of a TIDAL may comprise a blockchain where leaf entities of a Merkle tree for a block are hashes of sequences of strings that represent assertions and/or information bindings. In various embodiments, TIDALs may have multiple nodes that may provide information redundancy and agreement on acceptable and/or otherwise verified entries. Associated agreement policies and/or protocols may, in some embodiments, be optimized for a type of assertion that is recorded in a TIDAL.

Trusted TIDAL Derivatives: TIDAL derivatives may comprise distributed databases, ledgers, tables, and/or other structures with information derived from one or more TIDALs by a trusted entity. TIDAL derivatives may comprise information generated based on TIDAL information. In some embodiments, TIDAL derivatives may comprise information from the TIDALs with an index designed for relatively easy lookup. For example, TIDAL derivatives may comprise a hash table of bindings of keys and/or identifiers and/or attributes that may include current information, and/or may exclude information that has been updated by more recent entries (e.g., assertion revocations and/or the like).

Trust Agents: Trust agents may comprise software agents that may check TIDAL derivatives for consistency and/or veracity. Entities that may rely on assertions in various TIDALs may use a software agent to check copies of the TIDAL derivatives for integrity. Trust agents may also be configured to check one another.

Distributions of Trust Assertions

Embodiments of the disclosed trust and identity management architecture may provide for a highly-distributed platform for verifying trust assertions capable of verifying large numbers of trust assertions over relatively short periods of time. In some embodiments, trust assertions and associated information may be distributed in a variety of ways, including using one or more of:

Multiple TIDALs that may specialize in different kinds of trust assertions where assertion verifiers for root and delegated assertions for various assertion topics can be scaled and qualified as appropriate.

Multiple full nodes in TIDALs where there is redundancy in the process of assertion recording and/or in the maintenance and/or management of the ledger. Such redundancy can be scaled and designed according to the specific types of threats that may be launched against the types of assertions recorded in the TIDAL.

Multiple-trusted derivatives for each TIDAL, wherein information from a TIDAL can be organized in a trusted fashion for rapid verification. In some embodiments, TIDAL derivatives may be cross-verified for integrity.

Cryptographic Key Bindings

As discussed above, various disclosed embodiments may be used to manage identity information associated with entities. In some embodiments, mechanisms may be provided to securely and/or reliably assert information regarding entities and/or to permit people, systems, and/or other entities to securely and/or reliably discover or verify information about entities. Consistent with various disclosed embodiments, attributes that may be part of an entity's identity may include one or more cryptographic keys that may be used to verify identity and/or to address information to and/or otherwise securely communicate with an entity.

Cryptographic methods may be used in connection with various disclosed embodiments to ensure that associated identity management protocols are secure and/or reliable. In some embodiments, methods may be employed that reduce cryptographic key management and make associated cryptographic protocols relatively simple and/or efficient.

Information Binding

As used herein, binding may refer to securely associating one piece of information with another. Embodiments of the disclosed systems and methods may provide for securely and/or immutably associating strings of information (e.g., two binary strings) with well-defined meanings and/or in a well-defined context. In some embodiments, an authority may make an assertion that binds a string indicating an attribute of an entity with an identifier of an entity and/or with a cryptographic key to be used by the entity to request an action and/or to make trusted assertions (themselves being bindings of strings in context).

Various embodiments may be used to determine the provenance of information by securely binding identifiers and/or attributes with the information. For example, sensor data that is collected by a host may be bound to identifiers and/or attributes associated with the host to the sensor data.

Host IDs and Host ID Registration

Consistent with various embodiments, computation hosts, nodes, and/or other associated entities may have one or more associated identifiers that are unique to the host, node, and/or associated entity and from which a public ID may be generated. In some embodiments, the public ID may comprise a public key in an asymmetric cryptographic system. In various embodiments, this public ID may be referred to as a congenital cryptographic identifier ("CCI")

Host IDs may be registered with a host ID registry. In some embodiments, manufacturers and/or originators of hosts, nodes, and/or other associated entities may submit associated host IDs and/or CCIs to registration authorities. In some embodiments, submitted host IDs and/or CCIs may be submitted to registration authorities using secure communication protocols.

Domains

In various embodiments, domains may comprise labeled and/or registered areas of authority. For example, a domain may comprise a corporation labeled by a corporate name and/or some other moniker associated with the corporate name. In other embodiments, a domain may comprise any named organization and/or entity and/or individuals. Bindings may be made between individuals with IDs and domains that may describe the authorities those individuals have to make assertions about the domain, including bindings between the domain and domain attributes, sub-domains (e.g., in a hierarchy of domains), and/or keys, identifiers, and/or named and/or otherwise registered attributes.

Domain Registries

In certain embodiments, domain registries may comprise TIDALs that record information about domains in the form of assertions that immutably bind information and/or labels to domains under domain and/or sub-main authority. Thus, entities that are authorized to make assertions regarding a domain may register attributes of the domain, establish hierarchies of authority, and/or register public keys that may be used for protocols for making assertions with domain authority. In various embodiments, these assertions may include bindings of host identifiers with host attributes including, for example, keys used for establishing security associations among hosts and/or with other entities. Domain authorities may create hierarchies of authority by establishing registered and/or otherwise labeled sub-domains and/or naming and/or otherwise registering authorities for those subdomains.

Domain Topics

Consistent with various embodiments disclosed herein, domain topics may comprise labeled and/or otherwise registered areas of interest and/or authority within a domain about which assertions may be made and/or where name value pairs may have a well-defined context. Within an organization domain such as, for example, a corporation, topics may be associated with a variety of topics including, for example, products, services, policies, software objects, employee roles, and/or the like. In some embodiments, domain authorities may register topics and/or classes of objects that may be registered as part of a topic. While a sub-domain may be hierarchical, topics may be unique to a domain and may span sub-domains. In various embodiments, domain topics may be registered for the domain by a root domain authority.

Domain Authorities

Domain authorities may comprise entities that may be authorized to make assertions on behalf of a domain. Domain authorities may do so by employing secure protocols to submit assertions about a domain topic to a database, ledger, and/or TIDAL with which the domain is registered. In some embodiments, a root authority may be named for a domain and/or a root key (e.g., a public key) may bound with the domain identity. This binding may be entered into the database, ledger, and/or TIDAL as an assertion. Authority may be delegated to other domain entities (e.g., employees and/or authorized systems) using a process whereby the root authority and/or a previously delegated authority may use its registered private device key to securely submit an assertion to the TIDAL that binds a delegate ID to a subdomain or topic, and/or another assertion that binds the delegate ID to a public key.

Assertion Submitters

In some embodiments, assertion submitters may comprise entities that possess credentials, themselves recorded in a TIDAL, who have authority to submit assertions for consideration to be recorded in the TIDAL. Submitter IDs may designate trust domains with trust domain identifiers ("TDIDs"). In certain embodiments, each TDID may be associated with a machine-readable specification describing its scope of authority. The scope of authority may describe the IDs of trust domain subjects that the submitter can make assertions about and/or the types of attributes that the submitter can make assertions about.

For example, a submitter SI may be have the key associated with a TDID—dmv.CA.gov—uniquely associated with the state of California Department of Motor Vehicles. An entry in an associated TIDAL may include a hash of a document describing the scope of authority for SI. The scope of authority may include an array of attributes that are associated with the TDID dmv.CA.gov and which can be associated with public keys and/or with other IDs. SI may be restricted to make assertions about that trust domain, but SI can make assertions about other keys for other submitters, including binding them with the domain dmv.CA.gov but limiting their scope of authority to the business of some sub-domain of that domain, and perhaps further to specific types of assertions that the key can make such as, for example, bindings between vehicle IDs and license plate numbers and/or bindings between driver names and driver license numbers.

Figure 4:
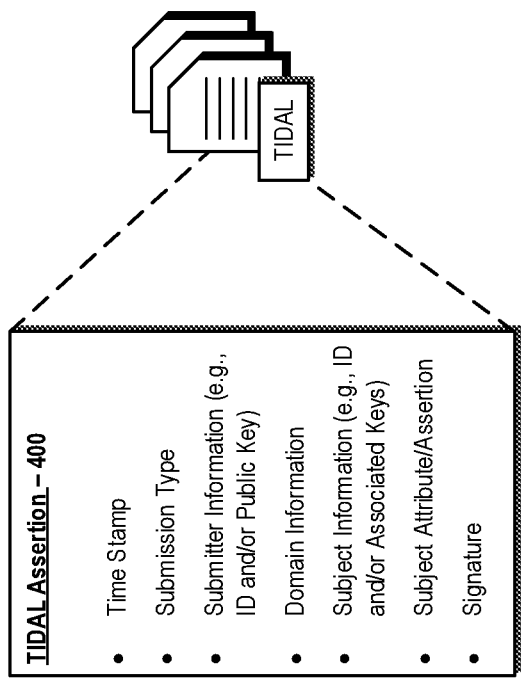
FIG. 4 illustrates an example of a submission to a ledger consistent with certain embodiments disclosed herein.

FIG. 4 illustrates an example of a submission 400 to a ledger consistent with certain embodiments disclosed herein. In various embodiments, a submission 400 may comprise information to be bound in the ledger that includes information relating to an associated submitter in addition to information regarding an associated assertion. For example, a submission 400 to a ledger may comprise one or more of a time stamp, a submission type, information relating to an associated submitter (e.g., identification information and/or associated public keys, a CCI, domain information such as a TDID, etc.), information associated with a subject of the submission (e.g., identification information and/or associated keys, a CCI, etc.), attributes and/or assertions to be bound to the subject, and/or a signature. It will be appreciated that ledger submissions may comprise a variety of other information in a variety of formats.

In certain embodiments, submissions to a TIDAL may be of the form:

{time stamp, submission type, submitter ID, submitter ID public key, TDID, subject ID, subject key, subject attribute name/value list, signature}

In some embodiments, the signature may be generated using a secret key associated with the submitter ID's public key. In further embodiments, the signature argument may include a hash of at least the previous fields.

In certain embodiments, the submission type may comprise a string that identifies any suitable number of valid types of assertions that may be entered into the TIDAL. In some embodiments, assertions associated with a revocation of a previous assertion may be distinguished in some way from other assertions.

TIDAL Verifiers and/or Witnesses

Assertions may be entered into TIDALs upon the agreement of multiple witnesses/verifiers that receive assertions from putative domain authorities concerning topics registered with the domain. Witnesses and/or verifiers may verify the authenticity of the submissions and/or the putative domain authorities and may check previous entries in a TIDAL and/or entries in other TIDALs to verify that the putative authority is in fact authorized to make such an assertion.

Figure 5:
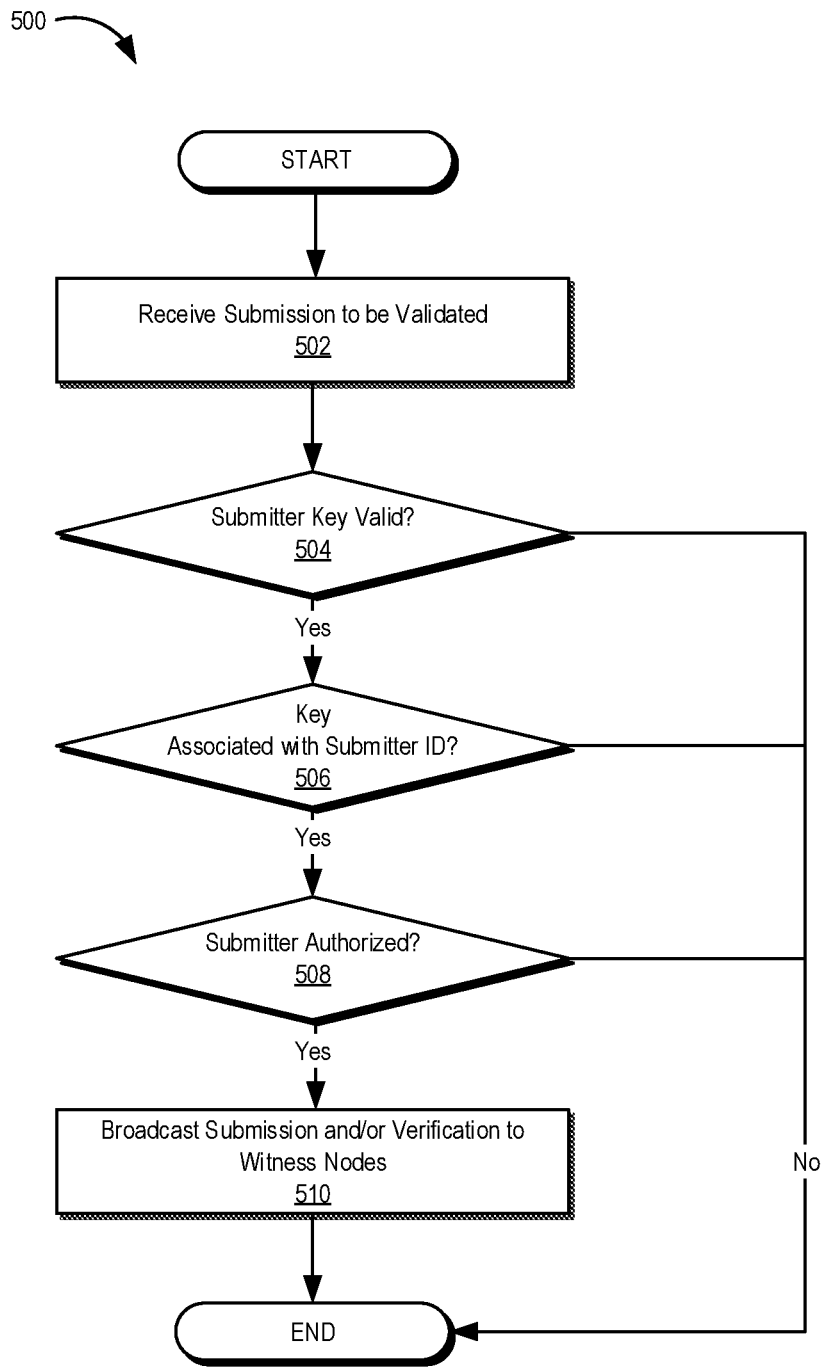
FIG. 5 illustrates a flow chart of an example of a method for verifying assertions in ledger submissions consistent with certain embodiments disclosed herein.

FIG. 5 illustrates a flow chart of an example of a method 500 for verifying assertions in ledger submissions consistent with certain embodiments disclosed herein. Consistent with various aspects of the disclosed embodiments, witnesses may receive TIDAL submissions from submitters 502. In certain embodiments, each submission may be received by multiple witnesses. In some embodiments, the witnesses may comprise node operators, as described in more detail below. Witnesses may verify one or more of the following:

The submitter ID public key is valid and has not been revoked 504, as may be verified by checking submissions for which the submitter ID is the subject and verifying that any relevant assertions needed to verify the current submission have not been revoked.

The key is associated with the submitter ID 506.

The submitter's scope of authority includes authority over the subject attributes included in the assertion 508, as may be verified by previous submissions about the submitter that have been recorded in the TIDAL.

Verified assertions may be broadcast to other verifier and/or witness nodes 510. In some embodiments, verified assertions may be placed into a pool to be entered into the TIDAL. When a threshold number of witnesses agree regarding the authenticity and/or the actual authority of the submitter (i.e., the putative authority) to make a subject submission and/or assertion, by using a byzantine agreement protocol and/or another protocol that is robust against byzantine errors and/or attacks, the submission may be adopted and/or otherwise entered into the ledger.

Node Operator

In various embodiments, a node operator may represent an entity that is authorized to enter new assertions into the TIDAL. Entries into the TIDAL may comprise one or more verified submissions. Node operators that are witnesses to assertion submissions may securely broadcast their submissions to other node operators. In certain embodiments, a byzantine consensus protocol ("BCP") may be used to choose a new set of verified submissions to be entered into the TIDAL. The participants of the BCP may be node operators, and each node operator may update its copy of the TIDAL. Depending on the nature of the BCP, the TIDAL may eventually converge to a consistent state. In some embodiments, the BCP may be selected to encourage relatively rapid convergence.

Permissioned TIDALs

In some embodiments, a permissioned TIDAL may be implemented where both node operators and submitters are qualified to make submissions and verified entries. Node operators can be entities who are motivated to ensure the authenticity of entries. For example, node operators may include one or more of state and/or national governments, licensing agencies, Internet service providers, application service providers, and/or banks, although other potential node operators are also envisioned. The burden of operating these TIDALs may not be particularly significant even when the number of subjects (e.g., keys) is many billions. A number of TIDALs may be employed that are federated but segregated in a way such that some applications may interact with a few smaller TIDALs and/or their derivatives.

Congenital Identifiers and Device Identities

Figure 6:
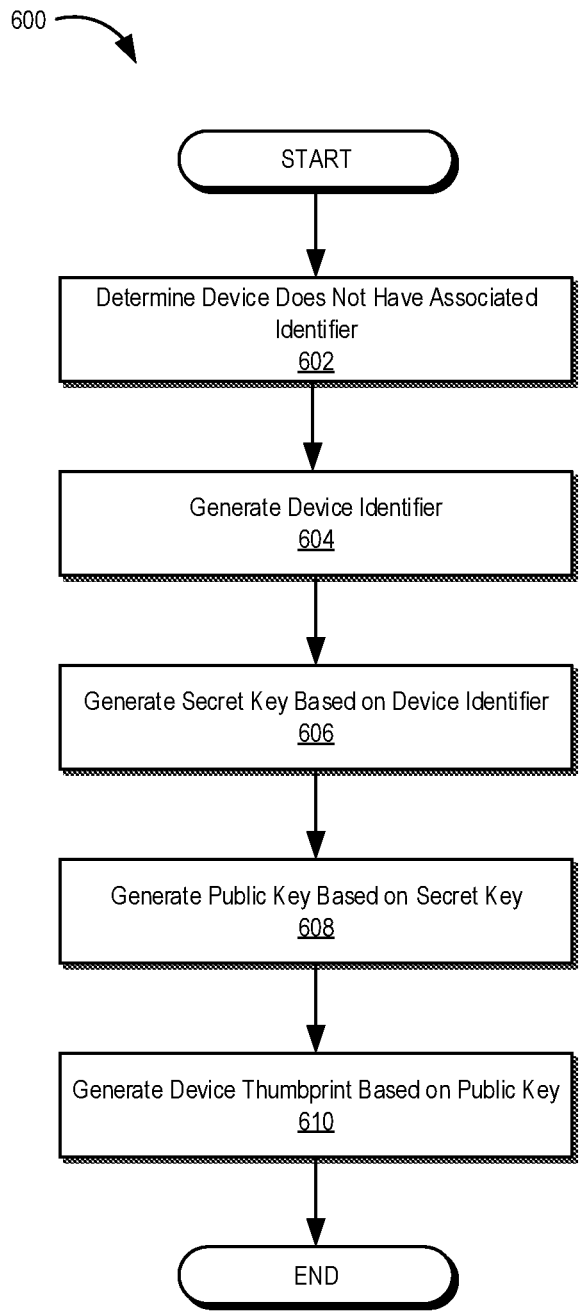
FIG. 6 illustrates a flow chart of an example of a method for generating a device identifier consistent with certain embodiments disclosed herein.

In at least one example, various embodiments may be used to register assertions about device identities and/or associated attributes within a TIDAL. FIG. 6 illustrates a flow chart of an example of a method 600 for generating a device identifier consistent with certain embodiments disclosed herein.

A hardware device may be placed in an inactivated state such as, for example, after assembly at test at a factory and/or after an action that returns the device to factory settings. At 602, the device may determine that it does not have an associated identifier. In some embodiments, resident device software may recognize an inactivated device state and a secure software method may be executed at 604 to initiate a robust, resident identifier for the device. For example, a physically unclonable function ("PUF") may be used to generate an identifier for the device based on characteristic of memory state on power-up of the device. In another example, a string of bits may be produced either externally or internally, unique to the device, and be securely stored so that it may be securely and/or reliably recalled from memory within the device. In either method, a string of random bits may be used to produce a triple (s, p, t) comprising a secret key, a public key, and a thumbprint for the device.

In some embodiments, at 606 a binary output of the PUF and/or other sequence of bits may be hashed into a random number of a length that can be used as the secret key, s, in a Diffie-Hellman cryptosystem for a prime field, elliptic curve group, and/or other suitable finite cyclic group with a distinguished generator g. The public key, p, may be derived at 608 from the secret key by p=gs. The thumbprint, t, may be produced from p at 610 using an appropriate one-way function t=h(p).

In certain embodiments, this generated triple may be referred to as a device's congenital cryptographic identifier. A device's CCI may be used in identification and/or identity authentication protocols in a variety of different ways. In some embodiments, the device thumbprint, t, which may be hex-coded, may function as a human readable unique identifier of the device. Consistent with embodiments disclosed herein, CCIs may comprise fundamental parameters that may be bound by authorities to other identifiers for the entity that possesses them.

Authority Identifiers

In certain instances, entities may not necessarily comprise computational devices. In such instances, different methods may be used to produce such triples. In some embodiments, domain, sub-domain, and/or domain topic authorities may each have authority identifiers which may be in the form of a triple (s, p, t). The specific identifiers may be bound to the domain and/or topic when a higher authority submits a binding of the authority's identifier with the domain and/or topic name.

Identity Assertion Registration and Verification

When a device and/or set of devices obtains a CCI, the manufacturer and/or owner of the device may act as a domain, subdomain, and/or domain topic authority and may register the device with a TIDAL and/or other associated database and/or ledger as being part of a registered domain under a specific topic. In some embodiments, the domain topic may comprise a device type. Registration of the device may proceed with the authority using their registered CCI to submit an assertion binding the device's CCI to the domain and/or topic. At this point, other bindings may also be made as part of the assertion entry and/or through other entries.

For example, an authority at ABC company, that is registered with TIDAL X, may submit a series of assertions, each signed with its registered CCI, to TIDAL X, where each assertion binds the ABC company domain and product topic to the device CCI public key and/or thumbprint. As part of these assertion entries, other attributes can be bound to the device, including other identifiers and/or classifiers. After registering the device, the authority and/or or a delegate of the authority can make additional assertions about the device, binding attributes to a registered device identifier and/or to other attributes that have been associated with the device.

Assertions may be submitted to a TIDAL through an API made available by a system maintaining the TIDAL. In various embodiments, the assertion may be placed in an assertion pool that is accessed by other TIDAL node operators. Node operators may verify that the submitter is a registered authority and/or has the authority to make the specific assertion that is submitted for verification. In some embodiments, the node operator may check that the submitter's CCI is associated with the domain and has not been revoked. The node operator may also check that the submitter has authority over the specific subdomain and/or topic for the assertion. These registration and authority checks may involve verification of previous assertions that can be found in the TIDAL and/or in other TIDALs. If the authority assertions are not found, the submitted assertion may be rejected.

In certain embodiments, TIDAL derivatives may be useful in making these checks. In some embodiments, a TIDAL derivative may comprise an ordered list of hashes of assertions that have been submitted to the TIDAL but with revoked entries removed and/or tagged. TIDAL derivatives may therefore be relatively small and verification using TIDAL derivatives may be relatively fast. The verifier may search the subject assertion within the TIDAL derivative. If the assertion within the TIDAL derivative is found, the assertion may be verified.

Public Verification of TIDAL Entries

TIDALs may be configured to allow any interested parties to verify assertions to determine whether or not a contemplated and/or otherwise pending action should be allowed. In various embodiments, TIDAL derivatives may be used to speed the verification process. For example, a TIDAL derivative may continuously process information from one or more TIDALs, removing or tagging no longer relevant information (e.g., revoked assertions), and may ensure that the verification information for assertions that the TIDAL derivative's users rely upon is available.

In certain embodiments, a TIDAL derivative may be designed to provide one or more of:
  Convenient Network Location: The physical and/or logical network location of TIDAL information may be convenient and/or optimized from a user's point of view.
  Convenient Format: Hashes of valid assertions that need to be verified by the users of the TIDAL derivative may be available in a form that is relatively convenient for those users.
  Integrity: The integrity of the information included in the TIDAL derivative may be maintained.

In various embodiments, multiple software agents may maintain multiple derivatives for a given TIDAL. Certain embodiments provide mechanisms for allowing agents to check one another's work, and user agents may access multiple TIDAL derivatives to detect byzantine errors from a given agent. An amount of redundancy (if any) may depend on the application and/or how secure a given agent implementation is expected to be. For example, if a TIDAL derivative is local and running on a trusted system, and the probability of error is acceptable, then in certain implementations no redundancy may be implemented. In other configurations, a user checking an assertion may automatically check multiple TIDAL derivatives and/or allow multiple TIDAL derivatives to provide associated checking response information and/or agree upon a consensus result.

When an entity would like to determine whether an action is allowed, associated policy may dictate that the entity needs to verify one or more assertions. In certain embodiments, verification of each trust assertion may comprise executing protocol code (inline or referenced) to determine the elements of the assertion to be verified and/or how they are hashed together in any entry that may appear in a TIDAL derivative's hash table. If the entry is found in the table, the assertion may be verified. Depending on an associated protocol, the TIDAL derivative may perform a secondary search to determine whether the assertion had been revoked and/or otherwise modified.

TIDALs consistent with various aspects of the disclosed embodiments may be designed to include large amounts of information and/or may be optimized for high integrity recording of assertions for many parties about many different kids of actions and/or things (e.g., products of trusted assertions). TIDAL derivatives may be located and/or otherwise optimized for the benefit of the user's and/or consumers of such trusted assertions.

Figure 7:
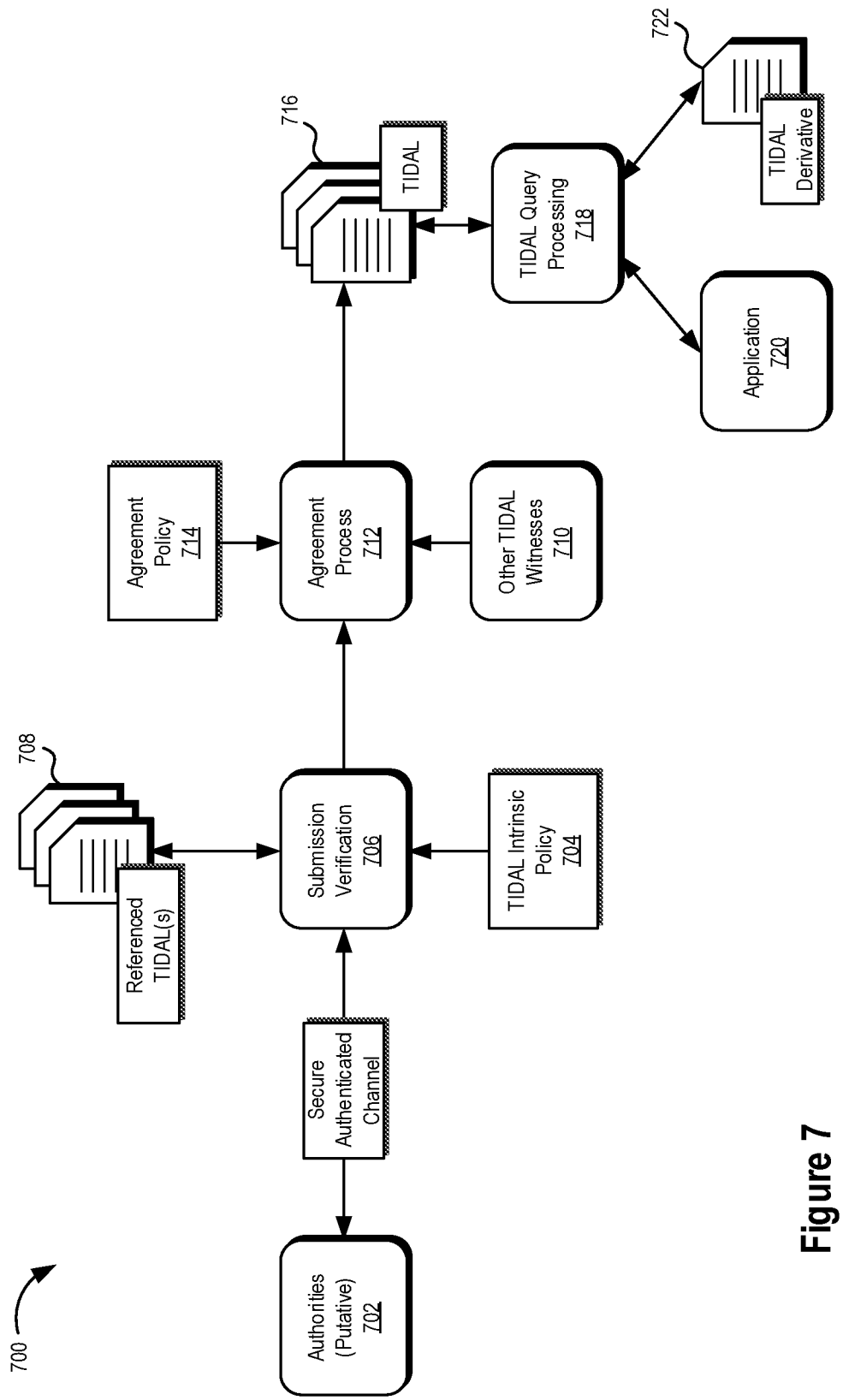
FIG. 7 illustrates a diagram of an example of a trusted assertion management architecture consistent with certain embodiments disclosed herein.

FIG. 7 illustrates a diagram of an example of a trusted assertion management architecture 700 consistent with certain embodiments disclosed herein. Various elements included in the illustrated architecture 700 may be performed and/or otherwise be implemented by one or more entities, nodes, devices, and/or systems including, for example, authority entities, nodes, devices, and/or systems, TIDAL verification entities, nodes, devices, and/or systems, TIDAL witness entities, nodes, devices, and/or systems, TIDAL derivative entities, nodes, devices, and/or systems, querying, applications, nodes, devices, and/or systems, and/or any other entity, node, device, application, system, and/or component thereof.

As discussed above, a TIDAL (e.g., TIDAL 716) may generally specialize in recording information in the form of assertions from one or more domains and/or areas (e.g, domains in an IoT deployment) including, for example, information from and/or about individuals, organizations, devices, sensors, events, software containers, and/or software applications. These assertions may comprise statements that other individuals and/or entities may rely on in a variety of decision processes.

In certain embodiments, a TIDAL 716 may be associated with an established policy 704 that may be used to verify submissions to the TIDAL 716 by domain authorities. Tentative submissions may be made by putative domain authorities 702 over a secure authenticated channel. In various embodiments, the secure authenticated channel may be established using embodiments of the Freshkey protocol described in more detail below.

A TIDAL witness node may perform submission verification processes 706 to verify the authenticity of a submission and/or an authority of the putative authority 702 to make an associated assertion. In some embodiments, verification of a submission may comprise referring to information included in a subject TIDAL 716 and/or one or more other TIDALs 708 to determine the validity of a submission and/or an authority of the putative authority 702 to make the submission. In further embodiments, verification of a submission may be performed in accordance with one or more policies 704 associated with a TIDAL 716.

In various embodiments, if relevant policies 704 are satisfied and a submission by the putative authority 702 is verified, the TIDAL witness node may broadcast the submission to other TIDAL witness nodes 710. The TIDAL witness node and/or other TIDAL witness nodes 710 may engage in a collective agreement process 712 to determine whether the submission should be immutably recorded in the TIDAL 716. In various embodiments, this process may be in accordance with one or more agreement policies 714 and/or protocols. For example, in various embodiments, the agreement process 712 may be reached in accordance with an agreement policy 714 comprising a byzantine agreement protocol and/or another suitable protocol. Once agreement has been reached, the submission may be considered validated by the TIDAL witness nodes and the submission may be recorded and/or otherwise entered into the ledger 716 maintained by the nodes.

TIDAL querying processing 718 may receive requests from querying systems and/or applications 720 interested in determining whether an assertion and/or a certain type of assertion (e.g., an assertion relating to a particular device and/or the like) has been recorded in the TIDAL 716. In various embodiments, responses provided to the querying systems and/or applications 720 may be based, at least in part, on information retrieved from a TIDAL derivative 722 consistent with various aspects of the disclosed embodiments.

Figure 8:
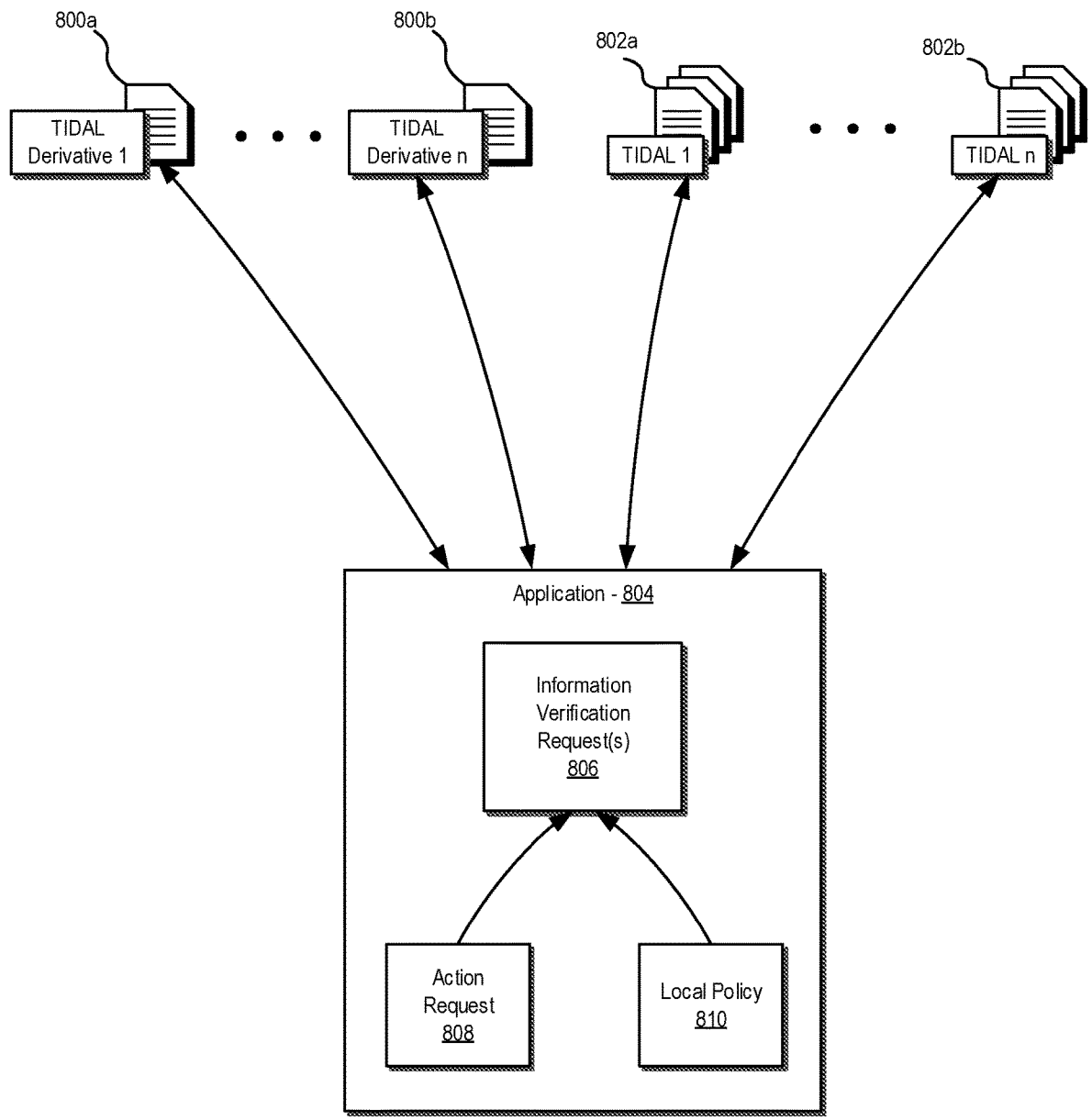
FIG. 8 illustrates a diagram showing an example of a ledger querying process consistent with certain embodiments disclosed herein.

FIG. 8 illustrates a diagram showing an example of a ledger querying process consistent with certain embodiments disclosed herein. In various embodiments, an entity, such as for example an application 804, a system, and/or the like, may be interested in performing an action of a subject action request 808. The action request 808 may rely on information from an authoritative source to engage in the subject action and/or make a decision in connection with a variety of processes.

In certain embodiments, the entity may generate information verification requests 806 based on the action request 808 and any associated local policy 810. Local policy 810 may, for example, articulate one or more requirements and/or actions relating to the validation of information to complete an action request 808. In certain embodiments, local policy 810 may direct the entity to generate information verification requests 806 and/or to query one or more TIDALs 800a, 800b and/or TIDAL derivatives 802a, 802b in connection with determining whether subject information is recorded in the TIDALs 800a, 800b and/or TIDAL derivatives 802a, 802b.

Interactions among applications (e.g., on devices, in the cloud, on mobile devices, in containers, and/or the like) can produce a variety of information in the form of assertions and/or associated records in TIDALs and/or TIDAL derivatives. In various embodiments, one or more articulated policies may determine and/or be enforced in connection with how the entities update one another. Various embodiments disclosed herein may provide a global system that is relatively efficient allowing information sources to produce information that other entities may reference and/or trust through the application of the TIDAL recording process and/or application-specific trusted reprocessing of TIDAL information by TIDAL derivatives.

Trust and Identity Management Ecosystem

Figure 9:
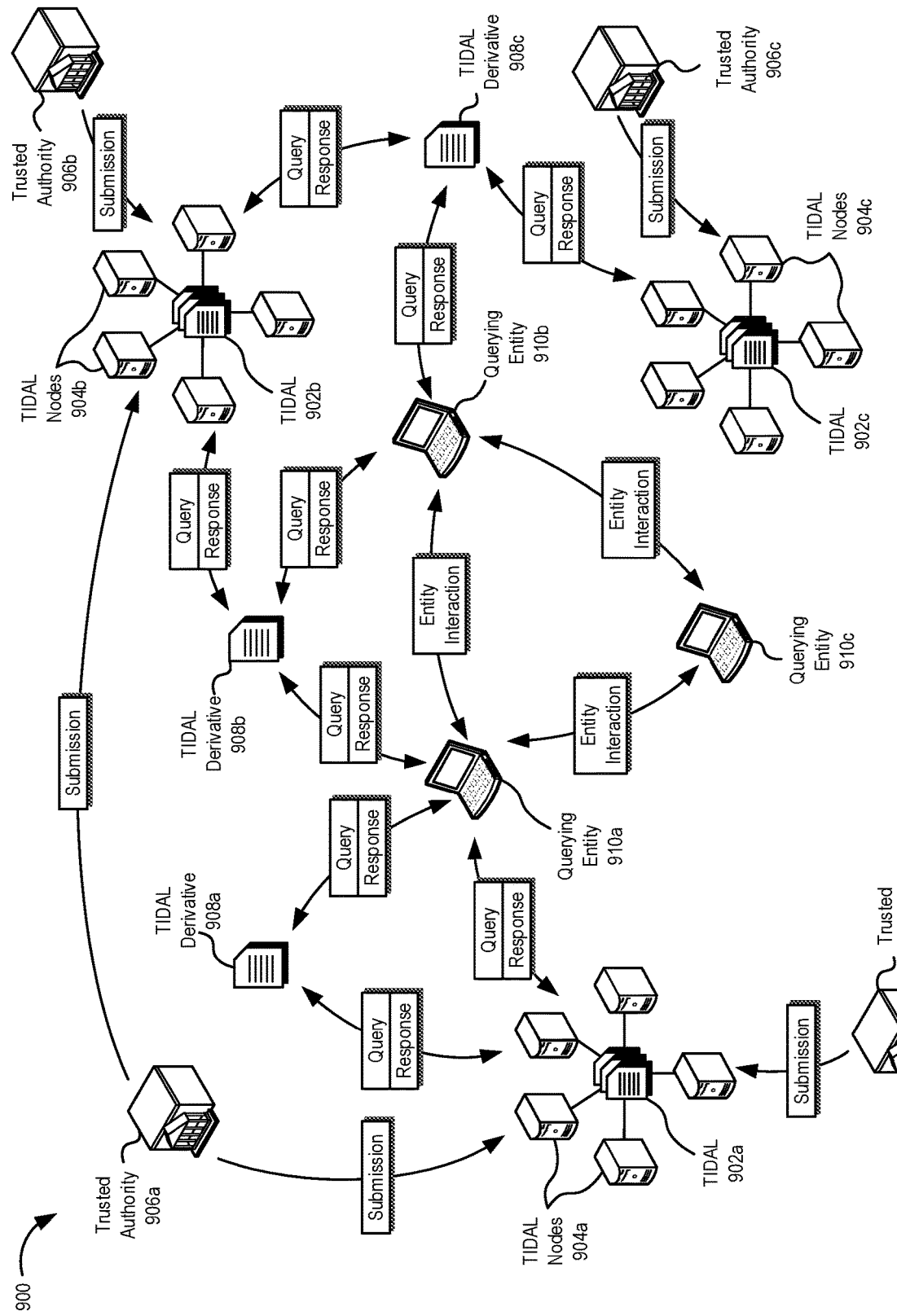
FIG. 9 illustrates a diagram showing an example of an ecosystem for managing trusted interactions using distributed ledgers consistent with certain embodiments disclosed herein.

FIG. 9 illustrates a diagram showing an example of an ecosystem 900 for managing trusted interactions using distributed ledgers such as, for example, TIDALs 902a-902c, consistent with certain embodiments disclosed herein. Various disclosed embodiments may facilitate an information ecosystem 900 with participants that include entities that produce assertions that may be used as evidence of authenticity and/or authority and entities that may consume and/or rely on this assertion information.

As shown in FIG. 9, consistent with certain disclosed embodiments, a network of one or more TIDALs 902a-902c and associated TIDAL node operators 904a-904c may immutably record trusted and/or verified assertions submitted from one or more trusted authorities 906a-906d. Querying entities 910a-910c, which may in some embodiments comprise applications executing on associated systems, may query the TIDALs 902a-902c and/or associated TIDAL derivatives 908a-908c in connection with a variety of assertion authentication processes and/or actions.

In certain embodiments, certain TIDALs 902a-902c may be used to record trusted assertions from a plurality of trusted authorities 906a-906c. For example, TIDAL 902a may record trusted assertions from trusted authority 906a and trusted authority 906d. In further embodiments, certain TIDALs 902a-902c may be used to record trusted assertions from a single trusted authority 906a-906c. For example, TIDAL 902b may be used to record trusted assertions from trusted authority 906b.

TIDAL derivatives 908a-908c may include information generated based on information recorded in one or more TIDALs 902a-902c. In some embodiments, a TIDAL derivative 908a-908c may include information generated based on information recorded in a single TIDAL 902a-902c. For example, TIDAL derivative 908a may include information generated based on information recorded in TIDAL 902a. In further embodiments, a TIDAL derivative 908a-908c may include information generated based on information recorded in a plurality of TIDALs 902a-902c. For example, TIDAL derivative 908c may include information generated based on information recorded in TIDAL 902b and TIDAL 902c. In additional embodiments, a TIDAL derivative 908a-908c may, alternatively and/or in addition to including information generated based on information recorded in one or more TIDALs 902a-902c, include information generated from one or more other TIDAL derivatives 908a-908c.

In connection with various interactions between querying entities 910a-910c and/or other processes and/or actions, querying entities 910a-910c may query one or more TIDALs 902a-902c and/or one or more TIDAL derivatives 908a-908c. In certain embodiments, a querying entity 910a-910c may query TIDALs 902a-902c directly. For example, in connection with an action, querying entity 910a may query TIDAL 902a. In further embodiments, a querying entity 910a-910c may query one or more TIDAL derivatives 908a-908c. A querying entity 910a-910c may also querying both of one or more TIDALs 902a-902c and one more TIDAL derivatives 908a-908c. For example, querying entity 910a may query TIDAL 902a and TIDAL derivative 908a.

In various embodiments, TIDALs 902a-902c and/or TIDAL derivatives 908a-908c may be open and/or public ledgers where any authenticated party may enter verified assertion into a ledger. In further embodiments, TIDALs 902a-902c and/or one or more TIDAL derivatives 908a-908c may be private and/or permissioned ledgers. TIDALs 902a-902c consistent with aspects of the disclosed embodiments may, in some instances, declare and/or make transparently available ingestion policies used to qualify assertions and/or agreement policies used to assure resistance to byzantine failures. Operators of TIDAL derivatives 908a-908c and/or designers of applications and/or other querying entities 910a-910c may decide which TIDALs 902a-902c may be useful for specific purposes, applications, and/or contexts, and operators of TIDALs 902a-902c and/or TIDAL derivatives 908a-908c may design ledger interfaces based on associated needs. In various embodiments, the ecosystem 900 may allow for distribution of many TIDAL nodes 904a-904c for robustness and/or for many different TIDALs 901a-902c to allow different enterprises to design ledgers and/or policies to meet various contextual requirements.

In various embodiments, an entity can choose and/or refine ingestion policy and/or an agreement policy associated with a TIDAL, the scope of information in an associated area of authority, and/or appropriate information that may be used and/or otherwise combined and/or processed (e.g., hashed) and made available through TIDAL derivatives. Agreement policies may be adjusted to reduce latency and/or allow for rapid dissemination of revocation and/or update information through processing methods associated with TIDAL derivatives. The distributed nature of various embodiments of the disclosed systems and methods may, among other things, ameliorate certain limitations associated with conventional centralized certificate authorities.

Secure Communication Overview

Various embodiments of the disclosed systems and methods for providing identity, identity bindings, and trusted attributes may recursively use themselves along with policy to enrich the infrastructure for extending and improving capabilities. To facilitate such systems and methods, various entities may cooperate and/or communicate relevant information using secure, authenticated communication channels.

Secure communications sessions are established every day between instances of an Internet browser and a web server. Such a such a secure session may be established using a protocol known as secure socket layer ("SSL") or its successor transport layer security. These protocols have many versions and/or variations, some of which may be relatively complicated, and while important aspects to the security of the web, may be associated with certain compromises and/or drawbacks. For example, compromises such as the Factoring RSA Export Key ("FREAK") and Heartbleed exploits and/or Bleichenbacher attacks may impact conventional methods for establishing secure sessions.

Generally speaking, the infrastructure for establishing security remediation when keys are compromised is relatively inadequate. For example, TLS uses certificate-based authentication that lacks PFA, as certificates signed with compromised keys are compromised even when they were signed before the compromise. In addition, while conventional protocols provide for both encrypted and authenticated channels, because of inadequate support for the certification of clients, client-side authentication is generally not implemented. Accordingly, users of web services may need to use passwords and other means to authenticate themselves even when using TLS.

Embodiments of the disclosed systems and methods address these and other issues associated with conventional protocols. Certain embodiments may be relatively more efficient in terms of the number of associated messages, message size, computation time, remediation, renewability, and/or extensibility. Various systems and methods may also be used in connection with secure stateless query-response protocols. Further embodiments may provide options for determining authority and rights of parties in an information exchange when information is governed by policies and rights in a relatively efficient manner and/or provide for the establishment of keys that may be used with information delivered on other channels.

Secure Communication Protocol Properties

Various embodiments disclosed herein to establish secure sessions and security associations between two or more parties may use an approach called authenticated key exchange ("AKE") where it is assumed that each party has a unique identity and a unique public-private key pair bound to that identity. A goal of AKE protocols is to establish a shared symmetric key between the two identified parties while allowing each party to validate that they are sharing the key with the other identified party and not with a "man in the middle" ("MITM") who might interpose in the key establishment protocol and establish a shared key with each of the original two parties allowing the MITM access to information and resources that would have been protected by the key putatively shared by the original parties.

In certain embodiments, every entity that has cryptographic ID, which may comprise a (s, p, t) triple as described above, that is registered with an appropriate TIDAL may use the protocol. As detailed above, in some embodiments, the values of p and t may correspond to a long-term public key and a public key hash.

Some embodiments of the disclosed communication protocols may provide for Perfect Forward Secrecy ("PFS") in connection with an authenticated key exchange. PFS may assure that if an identity-bound key of an entity is compromised sometime in the future, then shared keys established in AKE protocol sessions involving that entity before the compromise occurred remain secret.

Aspects of shared key agreement and/or exchange protocols disclosed herein may be relatively efficient in terms of the number and size of messages used by the protocol and associated computational loads. Embodiments disclosed herein may provide for stateless protocols, may be relatively simple compared to certain conventional techniques, and may be less subject to various types of failures and attacks.

Certain embodiments disclosed herein provide for stateless protocols, which may be relatively resistant to various types of errors. Aspects of the disclosed embodiments may, in certain implementations, use an out-of-band authentication mechanism. Such out-of-band authentication mechanisms may, in certain circumstances, replace the use of public key certificates (such as the X.509 certificates commonly used in SSL and TLS), but may have efficiency drawbacks. Embodiments of the disclosed systems and methods may use out-of-band authentication mechanisms in an efficient manner that may be used in a variety of applications, offering certain advances over conventional stateful, multi-pass, X.509 certificate-based AKE protocols.

Further embodiments of the disclosed systems and methods may provide assurance that authentication information used to authenticate the key (in the sense described above) is fresh. Certain conventional protocols may rely on extrinsic mechanisms such as certificate revocation lists ("CRLs") and heavy duty out-of-band protocols, including Online Certificate Status Protocol ("OCSP"), to attempt to provide freshness. Embodiments disclosed herein may provide for relatively easy-to-maintain intrinsic freshness with certain benefits over conventional protocols.

Authenticated Key Establishment Protocol

Figure 10:
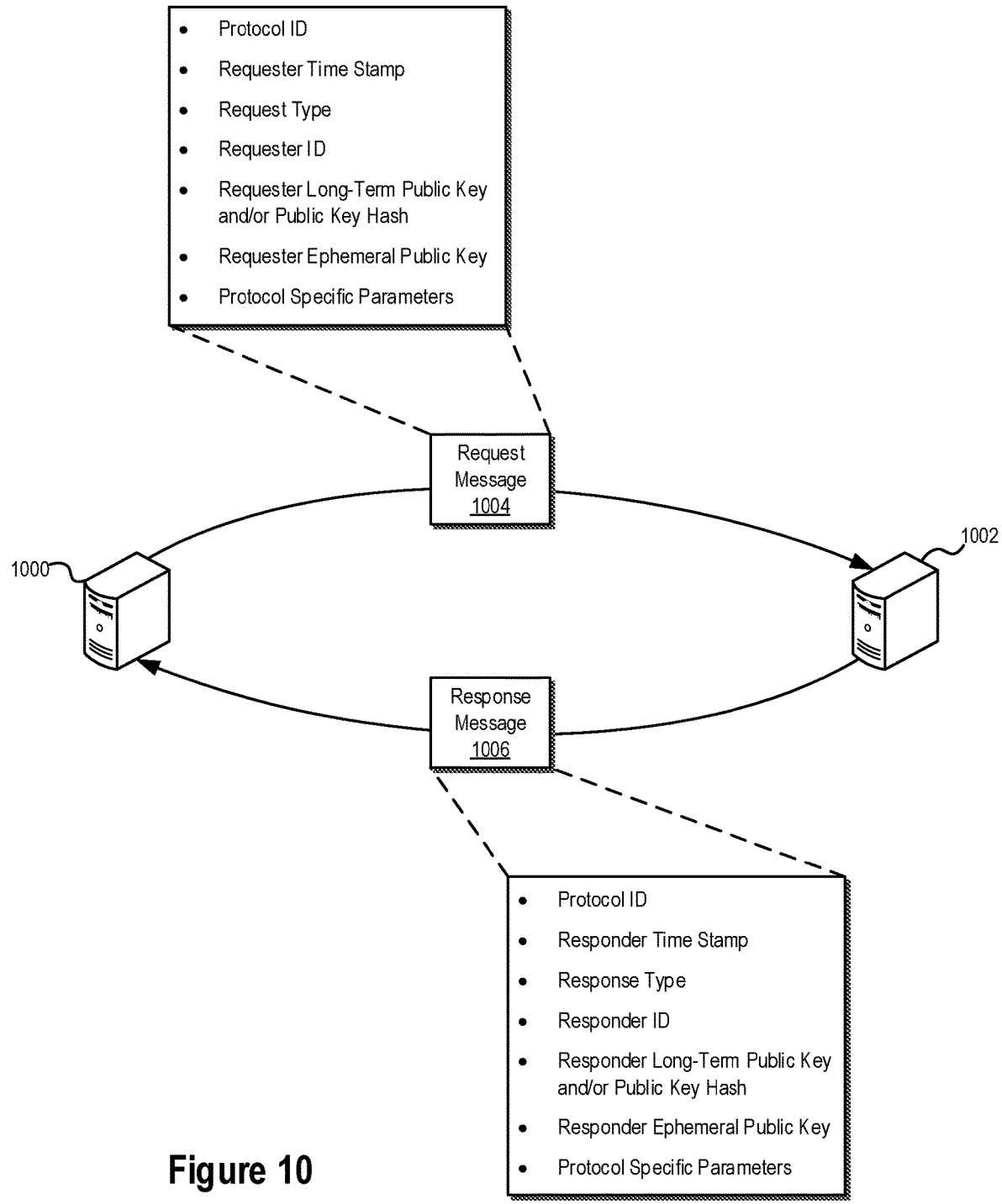
FIG. 10 illustrates an example of a key establishment protocol between two systems consistent with certain embodiments disclosed herein.

Embodiments disclosed herein provide for a secure protocol that may use certain specified request-response patterns. FIG. 10 illustrates an example of a key establishment protocol between two systems 1000, 1002 consistent with certain embodiments disclosed herein. In certain embodiments, the illustrated protocol may be used to establish keys between systems 1000, 1002 comprising, for example, a client and a server.

In certain instances, a key establishment protocol consistent with various embodiments disclosed herein may be referred to as the Freshkey protocol and/or variations thereof. Requests in connection with the protocol may be used to, among other things:

Establish a key for a secure and/or freshly authenticated channel.

Establish an authenticated security association for use in later authenticating requests for accessing resources (e.g., in an IoT application).

Facilitate access to a resource provided by the responder (e.g., a secure database lookup).

Facilitate access to an offline resource governing by information access policies (e.g, an encrypted file that may be delivered separately).

Certain embodiments of the disclosed protocol may be embedded in other stateless query response protocols, where the requester 1000 may ask for information with the responder 1002 answering with the desired information encrypted and/or authenticated with a key that can be constructed using other information included in the response. In this manner, it may not be necessary to establish a key before making the request. In some embodiments, a single request-response episode may suffice to both request the information and retrieve it securely from an authenticated source without any and/or with minimal pre-arrangement. Although certain implementations may not provide for negotiation, further embodiments may be highly flexible and extensible and provide for negotiation in certain applications.

As illustrated, a requesting system 1000 may communicate a request message 1004 to responding system 1002. In various embodiments, a request message 1004 may comprise one or more of the following:

Protocol ID (e.g., a string that may include a version identifier).
Requester time stamp.
Request type.
Requester ID info.
Requester long-term public key and/or public key hash.
Requester ephemeral public key.
Protocol specific parameters for the specific protocol ID.

The above information may be included as part of the request message 1004 in one or more associated message fields.

In response, the responding system 1002 may generate and communicate a response message 1006 to the requesting system 1000. In various embodiments, a response message 1002 may comprise one or more of the following:

Protocol ID (may respond with a different protocol ID than the request if allowed by the protocol identified by the requester).
Responder's time stamp.
Response type.
Responder ID info.
Responder long term public key and/or public key hash.
Responder ephemeral public key.
Protocol parameters for the protocol ID (e.g., protocol specific parameters).

The above information may be included as part of the response message 1006 in one or more associated message fields.

Various embodiments of the disclosed protocol may be implemented in connection with a variety of different public key systems including, for example, classical Diffie-Hellman (e.g., using a prime integer number field for a large prime), Elliptic curve-Diffie-Hellman ("ECDH"), and/or ring learning with errors ("R-LWE") key exchange. Certain other cryptographic systems may work in variations of embodiments of the disclosed protocol request/response pattern but may involve additional messages. Various embodiments disclosed herein are described in connection with classical Diffie-Hellman for purposes of explanation and illustration, and not limitation. For example, implementation with ECDH may be similar with different parameters and R-LWE, while not as symmetric, may work with embodiments of the disclosed request/response message pattern.

Information associated with request/response messages detailed above may be used to construct a freshly authenticated key with PFS between a requester and a responder. In some embodiments, this may be achieved without the use of public key certificates.

In one example, communication may be established between a requester A and a responder B. A request message from requester A may include a field that includes a requester protocol ID. In some embodiments, the requester protocol ID may describe a sub-protocol used with the Freshkey protocol pattern described herein. In certain embodiments, the protocol ID may comprise a version number of the protocol. The protocol ID and corresponding specification may be registered with a central authority such as the Internet assigned numbers authority ("IANA"), and may specify the ciphersuite as well as parameters to be used with the ciphersuite. In some embodiments, protocol-specific parameters included in corresponding fields of a request and/or response message may also be registered with the central authority.

A variety of different applications can be supported in the above-described sub-protocols including information rights management, role-based access control, and/or the like. In some circumstances, the responder's protocol ID may be the same protocol ID as the requester, or it may be another ID that is allowed according to the specification named in the requester's protocol ID field. This may allow for options to be chosen by the responder.

A requester's time stamp field in a request message may include a timestamp used as a reference by a number of sub-protocols. In some embodiments, the time stamp may be a current Unix time value and/or another standard clock value, and/or be a random integer value (e.g., as may be specified in the sub-protocol specification). In certain embodiments, the time stamp value may be included in protocols to thwart replay attacks.

A request type field in a request message may specify any number of variations of request that may be specified in the sub-protocol. For example, it may specify a new session key, session resumption, a security association to be used for future commands, and/or the like.

A requester ID information field in a request message may comprise a unique name and/or identifier that is associated with a requester's long-term public key or public key hash included in an associated field in the request message. The requester ID information may comprise, for example, one or more of a domain name, a sub-domain name, an e-mail address, an identifier prefix, an identifier number, and/or the like.

The requester long term public key and/or public key hash field of a request message may include a requester's entire long-term public key, public key parameters (e.g., the prime field and base in the case of Diffie-Hellman), a hash of the public key, and/or the like, and/or any other information that may be specified in the sub-protocol specification. In some embodiments, it may be represented in the form $b^M$ mod P where M is an integer and is the requester's long-term secret key.

The requester ephemeral public key field of a request message may include an ephemeral public key generated by the requester for a particular request. In the case of Diffie-Hellman, it may be of the form $b^e$ mod P where e is an integer and is the ephemeral secret key used for the key exchange.

The protocol specific parameters for the specific protocol ID field of a request message may include parameters used by the sub-protocol specified in the requester's protocol ID field. In certain embodiments, for a basic session key establishment, additional cryptographic parameters may not be needed.

Figure 11:
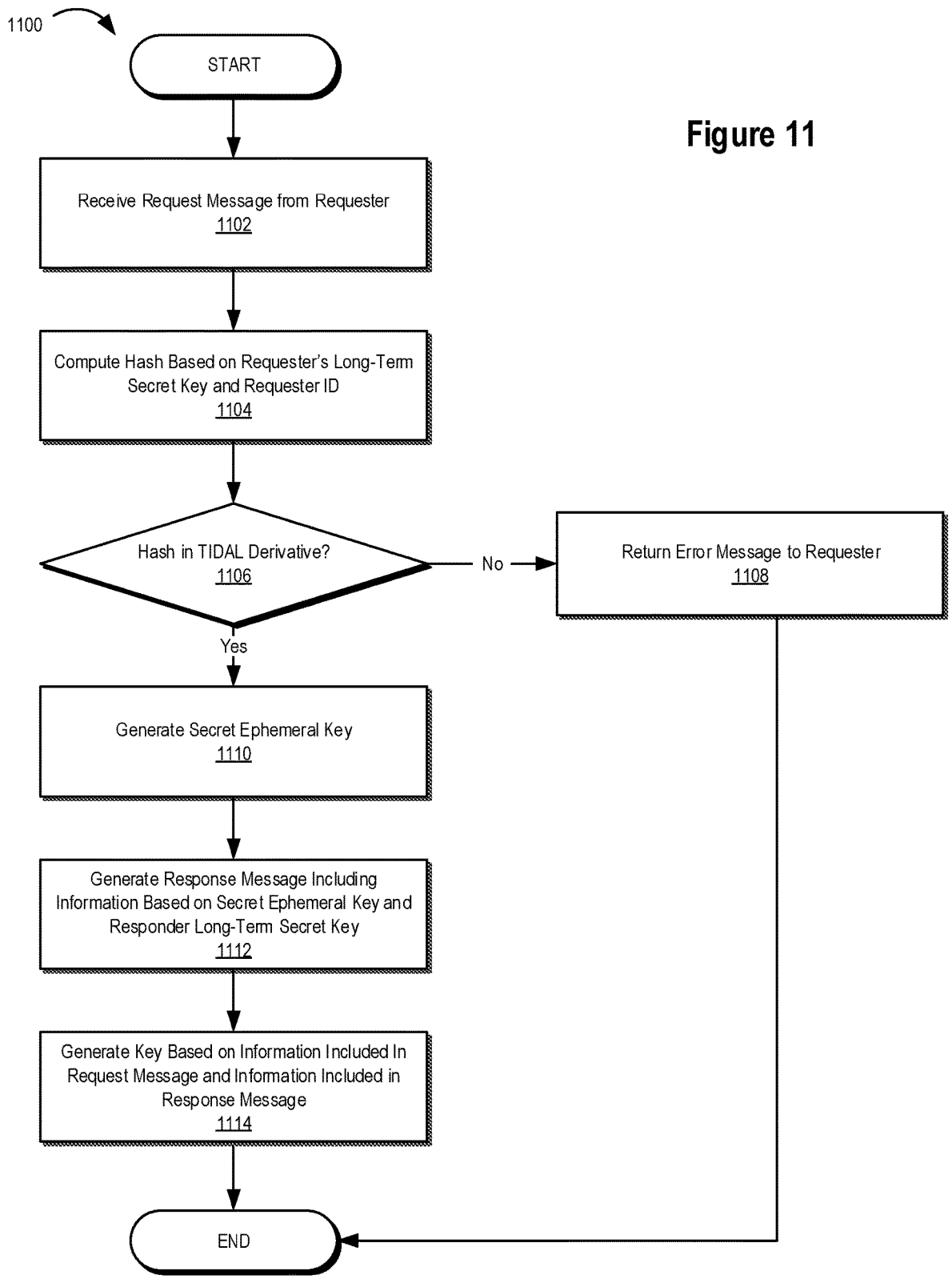
FIG. 11 illustrates a flow chart of an example of a method for generating a response message in a key establishment protocol consistent with certain embodiments disclosed herein.

FIG. 11 illustrates a flow chart of an example of a method 1100 for generating a response message in a key establishment protocol consistent with certain embodiments disclosed herein. Upon receipt of the request message at 1102, the responder may at 1104 compute the hash:

$$h(b^M \bmod P | \text{Requester ID info})$$

where h is a hash function such as SHA-512. At 1106, the computed value may be searched for and/or otherwise looked up in a trusted database such as a TIDAL, a TIDAL derivative, a local cache, and/or the like. If the value is not found and/or if the value corresponds to a revoked key, the responder may send back an error message in a field of the response message (e.g., a response type field) at 1108.

If the value is found, the responder may generate at 1110 a secret ephemeral key f, and locate its own long-term secret key N, record the current time as the responder's time stamp (e.g., in a responder time stamp field in a response message), and/or compute the following key at 1114:

$$K = h(b^{fe} | b^{MN} | \text{Requester's time stamp} | \text{Responder's time stamp})$$

The responder may further send the response message to the requester at 1112, which may include $b^f$ and $b^N$ (and/or a hash of $b^N$) in the appropriate message fields.

Figure 12:
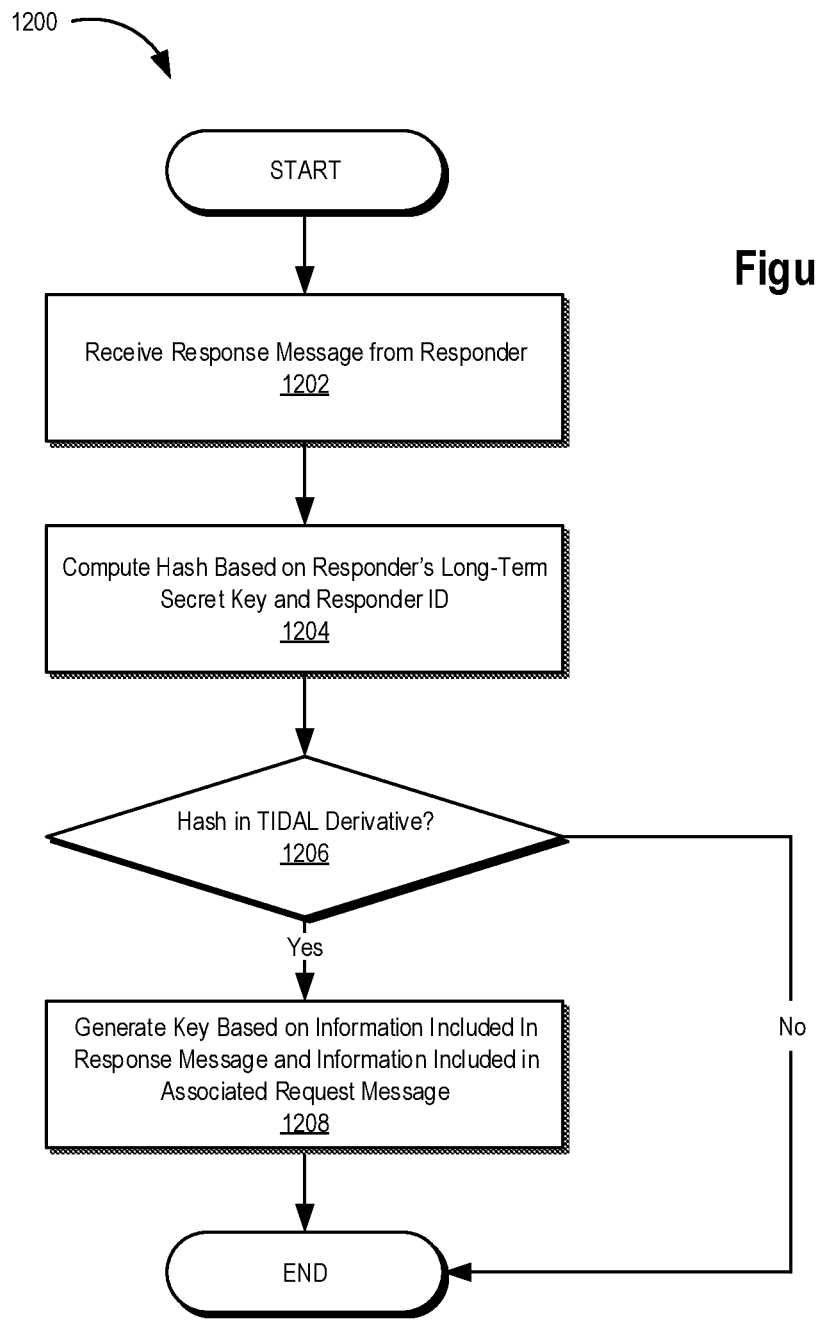
FIG. 12 illustrates a flow chart of an example of a method for generating a key in a key establishment protocol consistent with certain embodiments disclosed herein.

FIG. 12 illustrates a flow chart of an example of a method 1200 for generating a key in a key establishment protocol consistent with certain embodiments disclosed herein. Upon receiving the response message at 1202, the requester may compute the following at 1204:

$$h(b^N \bmod P | \text{Responder ID info})$$

The requester may determine at 1206 whether the computed value is in the trusted database and has not been revoked, using aspects of the methods described herein. If the long-term key is not valid or is revoked, then the requester may do whatever is specified by the specification identified by the protocol ID (which in some embodiments may comprise sending an error message and/or doing nothing). The requester may at 1208 construct the same key value K based in part on the information in the response message (e.g., $b^f$ and $b^N$ and/or the associated timestamp).

In various embodiments, the hash function used to compute K may depend on a variety of factors including, for example, the length of the key, specifications associated with the protocol ID information, and/or the like.

In some embodiments, sub-protocols may specify that the responder encrypt a requested piece of information (as specified in a protocol specific parameters field of a request message) using K (or a derivative of K) and include it in protocol parameters field of the response message. For example, this may be employed when the protocol wants the requester to validate that the responder has correctly computed the key, or when the requester wants to receive back an encrypted value of a database query as an example. In certain instances, the responder may return a keyed hash of a known value where K is used as the key as one sub-protocol response parameter and/or return an encrypted value of the requested information.

Consistent with embodiments disclosed herein, the key agreement may be authenticated by virtue of the fact that K is a function of a secret value $b^{MN}$, that is unique to the requester A and responder B, and K has PFS as a result of the fact that it is also derived from an ephemeral secret whose secret parameters will be discarded after K is constructed. If either M or N are compromised in the future, new keys may be at risk. In such an instance, the Freshkey protocol disclosed herein may be designed to make it easier to revoke keys in that case, as explained below.

In further embodiments, a sub-protocol may provide for anonymous and/or secure sessions where a client is not authenticated but a server is authenticated. In such an implementation, the client may play the role of requester, and the server may play the role of the responder. The client may signal for an anonymous secure session by using the appropriate protocol ID in a request message. The identity information and long-term public key fields of the request message may be null. The responder may reply as described above, however both sides may calculate the session key K as:

$$K = h(b^{fe} | b^{Ne} | \text{Requester's time stamp} | \text{responder's time stamp})$$

In certain instances, the server (responder) may use the responder's secret key N to calculate K, since $b^{Ne}$ is calculated using $b^e$. In this manner, the client may remain anonymous, but the server may be authenticated.

Various authentication and freshness properties that may be associated with embodiments of the disclosed systems and methods may rely, at least in part, on out-of-band lookups in a trusted database.

TIDAL Derivatives and Secure Communication Protocols

Various embodiments of the secure communication protocol described above may involve a requester and a responder verifying the authenticity and freshness of the binding between the counterparty's long-term public key and their ID. This verification may be performed relatively efficiently using a TIDAL derivative database.

In at least one illustrative example, a web browsing application may wish to have secure authenticated connection with a web server. Today, there are approximately one billion web servers in use. Public keys associated with web servers may be submitted to a TIDAL by one or more authorities similar to the certificate authorities who provide server certificates today. In blockchain infrastructures, indexes of the blockchain may be maintained. Similar indexing techniques may be implemented in connection with various disclosed embodiments for associated databases and/or blockchains.

In some embodiments, trusted indexing services may be used to construct a list of current (e.g., unrevoked) public key to ID bindings. Each binding may be a hash value, and presuming that the hash size is of a certain size (e.g., 512 bits to be quantum safe—i.e., resistant to use of Grover's algorithm), then the derived database may be a reasonably sized hash table (e.g, 64 Gb) which facilitates a relatively large number of copies of the derived database to be kept globally.

When a submitter's key is comprised, the compromised keys and keys below it in the authentication chain may be removed from the derived database if those keys were submitted after the compromise. When a party in the secure communication protocol needs to verify a counterparty's key, they may compute the hash of the public key and ID (e.g, the 512-bit hash) and using a service that accesses the derived database, and may match the result against the entries in the derived database.

This operation may be relatively efficient compared to, for example, checking the validity of certificates and relevant certificate chains used in conventional protocols, and benefits from providing the latest information about each key. In some embodiments, a party may have contacted a website/server in the past, and the hash value may be cached. In such an instance, checking against a smaller set of records of revoked assertions may be performed. In some embodiments, this may be done periodically and/or occasionally according to a caching policy. Other strategies can include the use of notification services that can notify a cache agent when any of its keys have been revoked.

In certain circumstances, some TIDALs may be larger than a billion entries. Despite this size, using fast lookup, shard database architecture, caches, and/or notification services may provide for embodiments of the disclosed secure communication protocols protocol to be preferable to the use of conventional certificate techniques, especially when the overall simplicity, efficiency, and/or flexibility of the protocol is considered.

In another application, as described above, TIDALs and derivative databases can be used for a secure DNS service, whereby a TIDAL is used to bind domain names to IP addresses. Embodiments of the disclosed secure communication protocol may support many sub-protocols that may authenticate many different bindings of identities and keys to other attributes, including authorization attributes, licenses for information services, establishment of security associations with IoT devices, and/or the like. Embodiments disclosed herein may provide for improved quantum safety as they may use hashes instead of certificates, and when quantum-safe public key protocols are used, such as R-LWE [x], the applications may be quantum safe as well.

Rights Managed Information Access

Various embodiments of the disclosed secure communication protocols can be used for a number of applications beyond the secure session establishment examples given above. For example, secure communication protocols consistent with embodiments disclosed herein may be used in connection with one or more of:

Role-based access control to information.
DRM applications governing access to intellectual property and/or otherwise proprietary information including, for example, content streams and/or records.
Access to medical records and/or other sensitive assets in a secure database.
Establishment and maintenance of secure association tables for IoT security monitors.

In certain of the above examples, a secure communication protocol message pattern consistent with the disclosed embodiments may be used, with a sub-protocol (that may have a registered Protocol ID) specifying additional parameters to be included in the protocol parameters for the protocol ID fields of the request and response messages.

Rights Managed Information Access—Role-Based Access Control

In role-based access control to information applications, embodiments of the disclosed secure communication protocol and a registered protocol ID may be used that may specify roles that can be associated with key information and/or ID information. In addition, a parameter may specify a secondary TIDAL where assertions that bind role IDs to the key or identity can be entered. When a request is made for information (e.g., using a SQL query), the request may include the query and the role attributes. The responder, in addition to checking the primary TIDAL for an assertion binding the key and identity, may also check the secondary TIDAL for one or more assertions binding the roles to the ID and/or key. By checking a policy table (that could be local and/or part of a TIDAL), and analyzing the query, the responder can decide to respond with the appropriate encrypted information.

Rights Managed Information Access—DRM Applications

Embodiments of the disclosed secure communication protocols and/or TIDALs may support a variety of DRM applications. In an illustrative example, a video playback application on a device might be used to rent videos. The device may have its own ID and key pair with a binding of those entered into a TIDAL. A user may have an ID registered with a service, and may use that ID to purchase a token for a specific rental. Various assertions could be entered in one or more TIDALs that may bind the token to the user, and the user to the device. When the user wishes to play the video, the device can submit a Freshkey request to a server, along with protocol specific parameters that include the token and the user, and the server can respond with an encrypted rights object, after checking the assertions that bind the user to the device, the token to the user, and the type of token (e.g., purchase or rental). In this case, the user may not necessarily have a key pair, as the device makes the request.

Rights Managed Information Access—Access to Medical Records

Various applications of the disclosed secure communication protocols may be used in connection with sharing medical records. In an illustrative example, there may be a TIDAL that contains a binding of person's public ID info and public key, and either the same TIDAL and/or another TIDAL may contain bindings of the person's public ID info and medical record ID ("MRID"). The person may sign a delegation binding between another entity's ID and the person's MRID and some limiting caveats such as a date range. This delegation binding assertion can then be entered into a TIDAL. The other entity may also have a binding between its ID and its public key. Consistent with embodiments disclosed herein, the disclosed secure communication protocols can be used to allow the entity to have access to a portion of the medical records as restricted by the caveats given in the parameters in the delegation assertion.

In another example, it may be desirable to make it possible for researchers to have access to portions of large number of medical records while protecting privacy. In such an application, the following may be presumed where the referenced bindings are reflected in one or more associated TIDALs:

A research review board ("RRB") may have identity info bound to a public key.
A researcher—researcher A—whose identity info is bound to a public key, may register a set of medical record parameters with the research board, along with a research plan including a data management plan with a research plan ID ("RPID"). The parameters may describe elements of medical records that the researcher would like to access, such as certain patient phenotypical information, symptoms, diagnoses, treatments, and/or results.
A data management application type ("DMAT") may be established that includes a set of attributes that provide various assurances of interest to the public and mitigates risks identified by a research review board.
An application certification authority may be established and/or otherwise used associated with an ID and public key that can certify instances of secure data management applications.
Instances of a secure data management application may be created that have ID info ("DMAIDs") bound to a public key and that can be certified and trusted to properly execute certified database query scripts, properly store results, and/or give access only to authorized individuals.
A software certification authority may be created and/or accessed.

A researcher—researcher B—may have associated identity information bound to a public key (and/or may be delegated access to information by researcher A).

Patients with ID information, public keys, and MRIDs who opt in to the research agenda may submit an assertion binding their MRID to the research plan.

The following actions can be taken to provide assertion that can be used to assemble the research data and give researchers access to it:

The research board may approve the secure data management application, and may sign an assertion binding the DMAT to the RPID.

The application certification authority may bind the DMAT to each of the secure data management application IDs.

The research board, upon approving the research plan, may sign an assertion that binds the set of medical record parameters to the RPID.

The research board may sign an assertion that binds researcher A ID to the RPID, with a parameter giving researcher A the right to delegate access to the researcher data to others.

Researcher A may sign an assertion binding researcher B's ID info to the RPID.

The protocol may be designed so that information from the medical records can be made available through an approved data management application that has been certified for this kind of protocol. The application instance may submit data requests and receive responses using its credentials and a secure communication protocol with the appropriate sub-protocol ID. The responses may be encrypted using keys that result from secure communication protocols, and the records may remain in an application's secure data store. Databases containing patient data records may provide the records containing the authorized medical record parameters after checking the required authorization assertion bindings in the appropriate TIDALs. The application instances may be certified to protect the information which, though it typically does not include personally identifiable information, may not necessarily be anonymized. The applications may be certified to properly display information to research personnel who provide the proper credentials bound to the research project that the information is itself bound to.

Rights Managed Information Access—IoT Applications

Embodiments of the disclosed secure communication protocols and TIDALs consistent with various aspects of the disclosed embodiments may be designed to allow security associations to be easily established between IoT devices and other devices that control them and/or receive data from them. IoT devices may be relatively simple with limited computational resources. As the disclosed secure communication protocols may be relatively simple protocols that do not involve significant resources for execution, they may be suitable for implementation in connection with IoT devices. When necessary, various aspects of the disclosed systems and methods may use the resources of other more capable devices it trusts to check credentials with TIDALs that can be used to determine what entities should have access to what resources the IoT device might provide access to.

Quantum Safety

In considering protocols for use in systems and by devices that function for many years in the future and protect information for even longer the life of those devices, it is wise to consider the risks from quantum computing attacks. Two known methods may be used by information systems attackers who might use a quantum computer. One is called Shor's algorithm which may render many public key cryptosystems ineffective given a moderately capable quantum computer. These include cryptosystems and public key infrastructure in common use today, including RSA encryption and signatures, Diffie-Hellman and Elliptic Curve Diffie-Hellman systems and the various NIST Digital Signature Standards. Grover's algorithm applies to search algorithms that can be executed by quantum computers. It is less impactful, but when applied collision searches for hash functions and key searches for symmetric key algorithms where the hash word size or key size is k bits, the search can be reduced to $2^{k/2}$ operations. Embodiments of the disclosed communication protocols described herein, with hash-based assertions used for authentication in conjunction with TIDALs, may thus be relatively quantum-safe when used with the R-LWE cryptosystem and similar systems that fit the above-detailed key agreement pattern.

Public Key Infrastructure Overview

As discussed above, various embodiments of the disclosed systems and methods may be used to build a public key infrastructure using blockchain and/or other distributed ledger technologies, as described above. In certain embodiments, a PKI may be used to form binding between public keys and/or other information and to allow entities to discover, interpret, and/or trust those bindings. The bindings may be used to help establish a context in which a public key can be trusted. In this manner, a PKI may allow for an entity to know who signed something and/or who can decrypt a message.

Public key technology may be used in a variety of applications where authenticity, governance, provenance, security, and/or privacy of information is desirable. For example, public key technology may be used in connection with facilitating communication between systems and/or devices included in the Internet of things ("IoT"), as well as systems for management of energy, transportation, supply chains, financial transactions, health care, and/or the like.

Public keys and/or paired private keys may be used to authenticate identity and authority and provide context for information by binding it to sets of events and/or environments. Keys can be used in a variety of automated systems where messages distributed among systems, including message that may cause certain actions to be performed, need to be authenticated. For example, an entity may use a public key to encrypt a message intended for specific recipients and use a private key paired with a public key to sign a message, document, and/or bind any set of data together, so that the data and its context can be portable. Public keys may also be used to sign portable computer code and/or applications so that their provenance and integrity can be verified by users.

Public Key Infrastructure Implementations

Public key technology may be used in a variety of applications where authenticity, governance, provenance, security, and/or privacy of information is desirable. For example, public key technology may be used in connection with facilitating communication between systems and/or devices included in the IoT, as well as systems for management of energy, transportation, supply chains, financial transactions, health care, and/or the like.

Public keys and/or paired private keys may be used to authenticate identity and authority and provide context for information by binding it to sets of events and/or environments. Keys can be used in a variety of automated systems where messages distributed among systems, including messages that may cause certain actions to be performed, need to be authenticated. For example, an entity may use a public key to encrypt a message intended for specific recipients and use a private key paired with a public key to sign a message, document, and/or bind any set of data together, so that the data and its context can be portable. Public keys may also be used to sign portable computer code and/or applications so that their provenance and integrity can be verified by users.

Embodiments of the disclosed systems and methods may allow for secure association of public keys with identities, context, and/or authority. Various embodiments may provide for a publicly and/or privately accessible infrastructure that allows for reliable understanding of such associations so that it can be determined, for example, who has access to encrypted information, who digitally signed a document, and/or whether they have the requisite authority to authenticate a transaction, issue a command, and/or accept an agreement. Certain embodiments may further provide for reliable, current, and/or updated knowledge regarding what a key represents, with what authority it can operate, and in what context it may operate, allowing for implementation in connection with a variety of virtual constructs that represent entities.

Various embodiments of the disclosed systems and methods may build a PKI using distributed ledger technologies such as, for example, a TIDAL comprising a blockchain. In certain embodiments, a PKI may be used to form binding between public keys and/or other information and to allow entities to discover, interpret, and/or trust those bindings. The bindings may be used to help establish a context in which a public key can be trusted. In this manner, a PKI may allow for an entity to know who signed something and/or who can decrypt a message.

A variety of types of information may be bound to a public key, including any of the types of information detailed herein. For example, information that may be bound to a public key may include one or more of:
 Identity descriptors.
 Titles of entities that may represent indirect and/or implicit claims of authority.
 Explicit claims of authority.
 Temporal context (e.g., dates of validity of a signature made with a key).
 Signature application context (that can be used to specify scope of election and/or authority, etc.).
 Protocol context (that can be used to specify what encryption and/or key agreement protocols a key can be used in).

Bindings may be made between a key and any suitable predicate and/or statement that an entity wishes to associate with a key consistent with certain disclosed embodiments. Such a predicate and/or statement may specify actions that the key authorizes and/or conditions under which the key can act. That is, the binding may represent an assertion about the public key.

In some instances, bindings may be made by digitally signing a document that contains a public key and any of the information that is to be bound to the public key. The result may be referred to as a public key certificate. Generally, a binding between a public key and a predicate may be signed by another a public key that, in some instances, may itself have a binding. In this manner, there may be hierarchies of keys, and the authority of a public key may be traced up a hierarchy to a root of trust that might be unconditionally trusted and/or trusted within an external policy that an application may use. Authority and/or scope may narrow as one descends the hierarchy and expand as one ascends.

Various PKI implementations may be instantiated using hierarchies where root policy represents implicit trust in a root key. This may be expanded to include multiple chains of bindings where each chain may have a different root, but where the semantics of the elements in the bindings may be similar and/or the same. For example, a PKI used for secure web browsing, where a web browser may use multiple root keys provided by multiple authorities that can verify bindings between keys and URLs. In certain instances, the trust model may remain in essence single rooted. The browser provider may trust a certain set of root keys each of which may make assertions about URLs or about keys that can sign higher level bindings granting the authority to bind keys to URLs.

Structures used to provide bindings may be described in X.509 standards and/or protocols. X.509-based protocols may be used to bind assertions relating to identity, temporal scope, and/or a limited set of usage policies. In some instances, PKI may be expanded using SAML ("Security Assertion Markup Language") certificates that may be used to implement more elaborate access control policies.

Among other things, SAML certificates can bind keys to attributes (e.g., the latter in the form of name-value pairs). They can also be used to provide conditions under which an authorizer, which may be verified with a public key, can perform a named action on a named resource under a stated set of conditions. SAML-based authorization systems may be particularly suitable when the assertions, the attribute naming, and protocol profiles are designed and implemented by a single entity and/or or by a standards-based organization that coordinates the various aspects of a SAML profile that is meant to support a set of explicit applications and/or use cases that can be implemented by independent parties. For example, SAML-based authorization systems may be used in connection with single sign on ("SSO") applications.

Various embodiments disclosed herein may provide for implementation of PKI in a variety of applications having a variety of associated implementation goals including, for example, one or more of:
 Supporting many different entities (e.g., devices, applications, people, organizations, etc.) that have associated public keys and various predicate bindings. As the number of entities that need to be trusted expand, various embodiments may be scaled in a relatively expedient and/or economic manner.
 Supporting various kinds of decision-making policies for various applications. For example, IoT applications implementing trust with different kinds of context-laden decision policies may use a variety of types of associated assertions that may need to be authenticated.
 Supporting distributed trust. For example, a PKI consistent with various disclosed embodiments may accommodate the involvement of many disparate parties that represent sources of knowledge and/or authority for specialized applications and/or certification of participating entities. Domain knowledge may be applied about what is legitimate, what is authentic, and/or what properties and/or conditions will need to be applied based on associated applications in different industries. This information may not be particularly centralized, and may by its nature be relatively distributed.
 Supporting localized policies. For example, different entities in different applications may use different policies to make decisions using information that can be provided using a PKF Various PKI implementations may support advanced, flexible, and/or evolutionary policies for different kinds of decisions including, for example, policies that employ learning capabilities.
 Keeping trust current by, among other things, making new assertions about public keys, making it easy to discover assertions (including renewals and/or revocations), and/or the like, and/or supporting the evolution and/or improvement of policies. Keys may start "working" in less trusted context, and over time as more and/or broader assertions about public keys are available, they can "earn" and/or otherwise be associated with trust. A device and/or application with an embedded key and/or ID may be manufactured and distributed. Using a PKI implementation consistent with various aspects of the disclosed embodiments, a key representing a device and/or application can gain endorsements for use in new contexts and/or temporary endorsements that can be issued and later affirmed (e.g, persistently affirmed).

Making information associated with trust in public keys, including current status and/or trustworthiness, readily available. For example, various aspects of the disclosed embodiments may make it relatively easy for a decision maker relying on a key to "check up" on that key as often as local policy requires and/or to subscribe to reliable and/or modern notification services so that status changes may be noted relatively quickly.

Facilitating relatively simple and/or reliable recovery from the compromise of a key. For example, if a key is compromised, various aspects of the disclosed embodiments may allow for reliance on assertions made by the key prior to the compromise, and the function of the key may be replaced following the compromise.

Various aspects of the disclosed systems and methods may provide for a PKI that is more organic and/or supports an evolution of trust that is more distributed, personal (e.g., or local), and/or less rigid.

Consistent with various embodiments disclosed herein, TIDAL and/or other distributed ledger technologies that may securely and/or immutably record transactions on a world-wide scale may be used to build a PKI. In certain embodiments, a blockchain may be established that may comprise a distributed available database and/or ledger of assertions about public keys. Entities may submit new entries that make assertions, each of which may be a set of claims, about a public key. Submitters may use an associated submitter public key to sign a binding of a subject public key to an assertion (e.g., in some circumstances, the subject could be the submitter's public key).

As discussed above, submissions to a distributed ledger consistent with various aspects of the disclosed embodiments may include one or more assertions. For example, a submission may include an assertion that includes at least two sets of claims: (1) a set of a priori verifiable claims about the authority of the submitter to make the second set of claims and (2) a set of new claims about the subject public key.

A TIDAL and/or other distributed ledger-based PKI consistent with various disclosed embodiments may use a set of nodes. Full nodes may maintain a complete copy of the database and/or ledger. Partial nodes may have specialized capabilities and may store none and/or part of the database and/or ledger, information generated from part and/or all of the database, and/or ledger, and/or an associated index thereof. Partial nodes may further maintain, for example, indexes, Bloom filters, shards, and/or other information used in connection with various aspects of the disclosed embodiments.

A candidate pool of submissions may be maintained comprising submissions that are not yet committed to the database and/or ledger. Various aspects of the disclosed embodiments may provide a mechanism for achieving consensus in accordance with one or more articulated agreement protocols and/or policies. For example, a BCP may be used whereby various full nodes agree on a block of submissions to be written to the TIDAL database and/or ledger. For example, each node may verify the a priori verifiable claims made by a submitter and/or determine other compliance with policy. A node may be chosen (or otherwise emerge) according to protocol to propose a next block of submissions, and other nodes may register agreement. When the BCP concludes a block is written, other nodes may update the database and/or ledger. A block may, for example, include one or more of a previous block header hash, a merkle root of a hash tree of the submissions included in the block, and/or a time stamp for the block.

As detailed above, certain implementations of the disclosed PKI may provide for a mechanism for reading and/or querying the TIDAL. For example, a TIDAL comprising a blockchain may be indexed by a hash, thumbprint, and/or other mechanism of the subject public key in submissions to expedite an answer to a query (e.g., "Tell me everything you know about a specific public key," "Is a specific public key still valid?" etc.).

Certain embodiments of the disclosed PKI may further provide for a subscription interface where one can subscribe to new assertions relating to a key and/or a mechanism for maintaining dictionaries and/or other information for terms used in assertions.

Various embodiments of the disclosed systems and methods may, for example, provide for one or more of:

Distributed trust where reliability may be related (e.g., proportional) to a number of participating nodes and/or their independence. Multiple witnesses are associated with each event (e.g., the making of an assertion).

Resistance to byzantine failures and resistance to single point failures.

Immutability—there is a reduced chance to deny the occurrence of an event and increased security regarding the actions associated with a submitter's private key. For example, in some embodiments, when a signed submission is included in the TIDAL, only the integrity of the submitter's key needs to be trusted for the small length of time around the block's timestamp. If the key is compromised subsequently, assertions made before the compromise remain reliable. Similarly, if the signing key was compromised before a timestamp before but recovered before the moment of signing, the assertion made by the key may also be relied on.

An infrastructure that supports relatively short-lived keys. TIDALs consistent with various embodiments may allow for generation and/or introduction of new keys while remaining relatively efficient.

The ability to easily make and/or discover new assertions about a public key so that keys can be revoked in a relatively straightforward manner, temporal and/or organization context extended, and policies used by decisions makers can evolve according to new conditions that can be met using new assertions.

The ability of different entities, including specialized entities, to make different assertions based on their associated expertise and/or ability relating to various classes and/or types of keys. For example, a safety tester (and/or an associated delegate) can make assertions about public keys that represent devices that have been successfully tested and/or certified.

Embodiments of the disclosed systems and methods may provide a mechanism for determining whether a key can be trusted to take an action in a particular context. Various embodiments may make it relatively easy for entities to make assertions about keys to provide evidence (i.e., key assertions) written to the TIDAL. With the availability of local policies as well as policy restrictions in the TIDAL, questions relating to the associated keys may be answered.

In various embodiments, trust graphs and/or policy graphs can be used in connection with making decisions relating to keys. For example, trust graphs, policy graphs, and/or portions of the same can be embedded in a TIDAL (potentially along with other assertions) and interact with local trust and policy enforcement mechanisms.

Various disclosed embodiments may be used in conjunction with a key distribution infrastructure to support a DRM platform that can govern access to a variety of information, and different entities and/or organizations may use the platform in different ways for information of varied value depending on associated policy. Using TIDALs in this manner may allow for distribution of assertions, policies, and/or conditions of trust, allowing for more universal and/or effectively targeted rights management. Certain embodiments may further reduce the consequences of key compromise (e.g., compared to using free floating certificates with an internal time stamp) and/or, by making assertions easier to distribute securely and/or find, may make it easier to recover from key compromise and/or using shorter-lived keys in more applications.

IoT Device Registration, Personalization, and/or Secure Operation

In at least one example implementation of various disclosed embodiments, a device manufacturer may have established credentials that are reflected in a TIDAL that includes assertions about the manufacturer's device origination keys. The keys may be used by the manufacturer to certify a binding of manufactured device serial numbers, manufacturer claimed attributions and/or the like. The device may further store a public key unique to the device (whereby the corresponding secret key is kept within the device). The manufacturer can submit these bindings for each of these devices to the blockchain. Other variations are possible, including variations that use hash IDs without public keys, symmetric keys, and/or the like. Once in the TIDAL, the device IDs can be referred by others so that devices can be personalized after purchase. The devices can acquire additional certifications for safety and/or compliance with codes for use within specialized ecosystems (e.g., DRM systems and/or the like).

System Architecture

Figure 13:
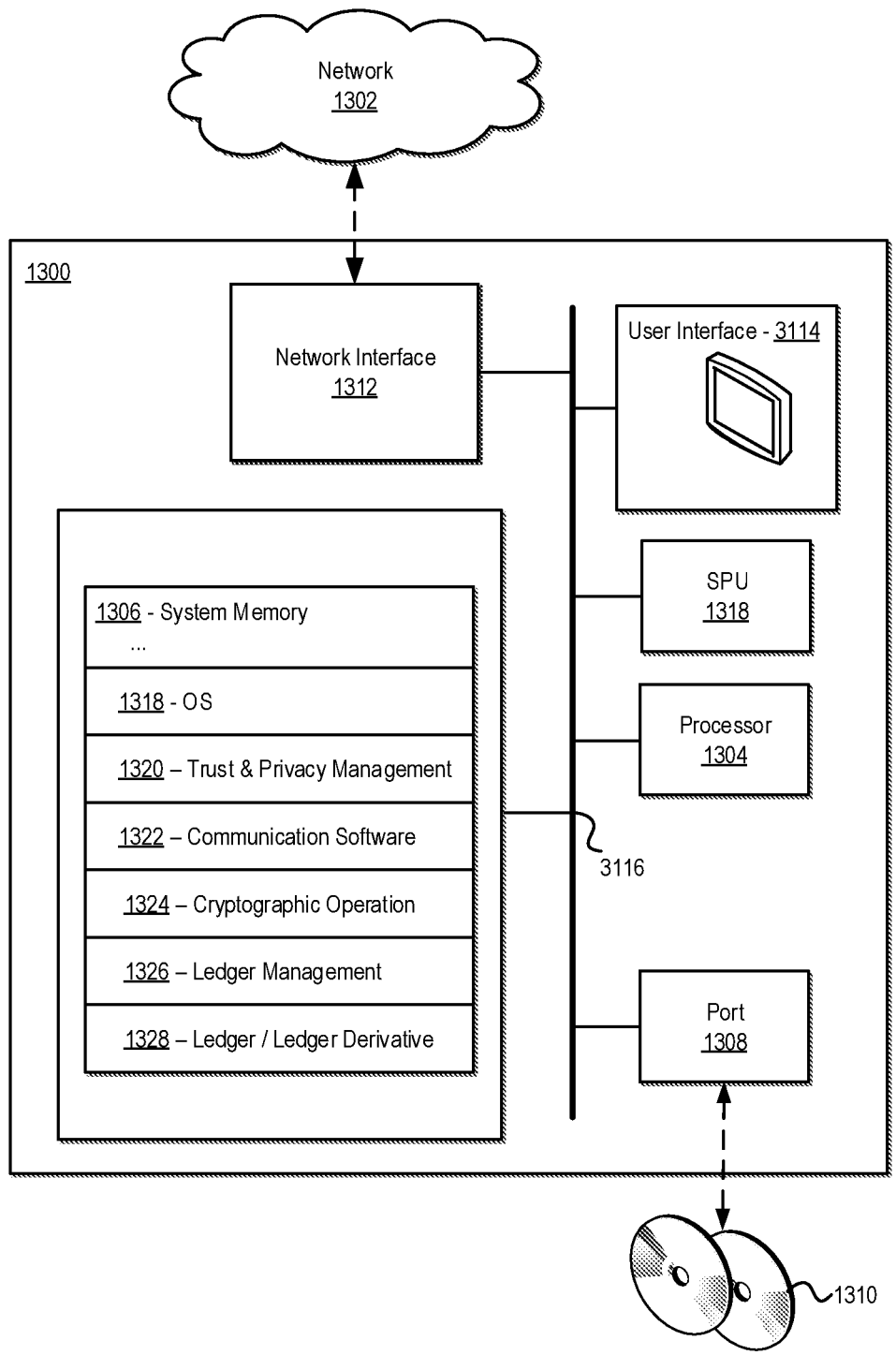
FIG. 13 illustrates an example of a system that may be used to implement certain embodiments of the systems and methods of the present disclosure

FIG. 13 illustrates an example of a system 1300 that may be used to implement certain embodiments of the systems and methods of the present disclosure. The system 1300 of FIG. 13 may comprise a system and/or device associated with a requester, a responder, an assertion submitter, a witness, distributed ledger node operator, and/or a querying system consistent with embodiments disclosed herein, and/or any other system, device, entity, node, application, and/or component configured to implement embodiments of the disclosed systems and methods The various systems and/or devices used in connection with aspects the disclosed embodiments may be communicatively coupled using a variety of networks and/or network connections (e.g., network 1302). In certain embodiments, the network 1302 may comprise a variety of network communication devices and/or channels and may utilize any suitable communications protocols and/or standards facilitating communication between the systems and/or devices. The network 1302 may comprise the Internet, a local area network, a virtual private network, and/or any other communication network utilizing one or more electronic communication technologies and/or standards (e.g, Ethernet or the like). In some embodiments, the network 1302 may comprise a wireless carrier system such as a personal communications system ("PCS"), and/or any other suitable communication system incorporating any suitable communication standards and/or protocols. In further embodiments, the network 1302 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 1302 may incorporate one or more satellite communication links. In yet further embodiments, the network 1302 may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 1, the example system 1300 may comprise: a processing unit 1304; system memory 1306, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 1304; a port 1308 for interfacing with removable memory 1310 that may include one or more diskettes, optical storage mediums (e.g, flash memory, thumb drives, USB dongles, compact discs, DVDs, etc.) and/or other non-transitory computer-readable storage mediums; a network interface 1312 for communicating with other systems via one or more network connections and/or networks 1302 using one or more communication technologies; a user interface 1314 that may include a display and/or one or more input/output devices such as, for example, a touchscreen, a keyboard, a mouse, a track pad, and the like; and one or more busses 3116 for communicatively coupling the elements of the system.

In some embodiments, the system 1300 may, alternatively or in addition, include an SPU 1318 that is protected from tampering by a user of the system or other entities by utilizing secure physical and/or virtual security techniques.

An SPU 1318 can help enhance the security of sensitive operations such as personal information management, trusted credential and/or key management, privacy and policy management, and other aspects of the systems and methods disclosed herein. In certain embodiments, the SPU 1318 may operate in a logically secure processing domain and be configured to protect and operate on secret information, as described herein. In some embodiments, the SPU 1318 may include internal memory storing executable instructions or programs configured to enable the SPU 1318 to perform secure operations, as described herein.

The operation of the system 1300 may be generally controlled by the processing unit 1304 and/or an SPU 1318 operating by executing software instructions and programs stored in the system memory 1306 (and/or other computer-readable media, such as removable memory 1310). The system memory 1306 may store a variety of executable programs or modules for controlling the operation of the system. For example, the system memory may include an operating system ("OS") 1318 that may manage and coordinate, at least in part, system hardware resources and provide for common services for execution of various applications and a trust and privacy management system 1320 for implementing trust and privacy management functionality including protection and/or management of personal data through management and/or enforcement of associated policies. The system memory 1306 may further include, without limitation, communication software 1322 configured to enable in part communication with and by the system, one or more applications, a cryptographic operation module 1324 configured to perform various aspects of the disclosed embodiments (e.g., message generation, cryptographic key and hashing operations, etc.), a ledger management module 1326 configured to perform various ledger management operations consistent with the disclosed embodiments, one or more distributed ledgers and/or ledger derivatives 1328, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified within the scope and equivalents of the appended claims.

What is claimed is:

1. A method for establishing a cryptographic key shared between a first system and a second system, the method comprising:

receiving, by the first system from the second system, a key establishment message, the key establishment message comprising an indication of a long-term secret key of the second system, an indication of an ephemeral secret key of the second system, and identification information associated with the second system;

generating a first check value based on the indication of the long-term secret key of the second system and the identification information associated with the second system;

transmitting, from the first system to a trusted assertion management system, a query requesting an indication of whether the first check value is included in a first ledger database maintained by the trusted assertion management system;

receiving, at the first system from the trusted assertion management system, an indication that the first check value is included in the first ledger database managed by the trusted assertion management system; and generating, based on receiving the indication that the first check value is included in the first ledger database, a cryptographic key, the cryptographic key being generated based on an indication of a long-term secret key of the first system, an indication of an ephemeral secret key of the first system, a time stamp associated with the first system, and information included in the key establishment message.

2. The method of claim 1, wherein the first ledger database comprises cryptographically linked ledger entries.

3. The method of claim 2, wherein the first ledger database comprises a blockchain ledger.

4. The method of claim 1, wherein the first ledger database comprises at least one entry binding the indication of the long-term secret key of the second system and the identification information associated with the second system.

5. The method of claim 1, wherein generating the first check value comprises generating a hash value based on the indication of the long-term secret key of the second system and the identification information associated with the second system.

6. The method of claim 1, wherein the first ledger database comprises entries generated based on information included in a second ledger database.

7. The method of claim 1, wherein the first ledger database comprises entries generated based on information included in a plurality of other ledger databases.

8. The method of claim 1, wherein the first ledger database comprises entries generated by hashing information included in at least one other ledger database.

9. The method of claim 1, wherein the key establishment message is associated with a key establishment protocol and wherein generating the cryptographic key is performed in accordance with the key establishment protocol.

10. The method of claim 1, wherein the indication of the long-term secret key of the second system comprises the long-term secret key of the second system.

11. The method of claim 1, wherein the indication of the long-term secret key of the second system comprises a hash of the long-term secret key of the second system.

12. The method of claim 1, wherein the indication of the ephemeral secret key of the second system comprises the ephemeral secret key of the second system.

13. The method of claim 1, wherein the indication of the long-term secret key of the first system comprises the long-term secret key of the first system.

14. The method of claim 1, wherein the indication of the long-term secret key of the first system comprises a hash of the long-term secret key of the first system.

15. The method of claim 1, wherein the indication of the ephemeral secret key of the first system comprises the ephemeral secret key of the first system.

16. The method of claim 1, wherein the information included in the key establishment message used to generate the cryptographic key comprises the indication of the long-term secret key of the second system and the indication of the ephemeral secret key of the second system.

17. The method of claim 1, wherein the method further comprises encrypting a piece of information using the cryptographic key to generate an encrypted piece of information.

18. The method of claim 17, wherein the method further comprises transmitting the encrypted piece of information from the first system to the second system.

19. The method of claim 18, wherein the encrypting the piece of information and the transmitting the encrypted piece of information is performed in accordance with a key establishment protocol associated with the key establishment message.

* * * * *